United States Patent
Miriyala et al.

(10) Patent No.: US 12,101,227 B2
(45) Date of Patent: Sep. 24, 2024

(54) NETWORK POLICY VALIDATION

(71) Applicant: Juniper Networks, Inc., Sunnyvale, CA (US)

(72) Inventors: Prasad Miriyala, San Jose, CA (US); FNU Nadeem, Fremont, CA (US); Sayali Mane, Milpitas, CA (US); Ankur Tandon, San Francisco, CA (US); Sajeesh Mathew, Saratoga, CA (US); Pranav Cherukupalli, Milpitas, CA (US); Khushi Vaidya, Berkeley, CA (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 18/313,131

(22) Filed: May 5, 2023

(65) Prior Publication Data
US 2024/0223454 A1 Jul. 4, 2024

Related U.S. Application Data

(60) Provisional application No. 63/478,089, filed on Dec. 30, 2022.

(51) Int. Cl.
*G06F 15/173* (2006.01)
*H04L 41/0681* (2022.01)
*H04L 41/0894* (2022.01)

(52) U.S. Cl.
CPC ...... *H04L 41/0894* (2022.05); *H04L 41/0681* (2013.01)

(58) Field of Classification Search
CPC .......... H04L 41/0894; H04L 41/0681
See application file for complete search history.

(56) References Cited

U.S. PATENT DOCUMENTS

| 7,599,290 | B2 | 10/2009 | Dos Remedios et al. |
| 7,630,314 | B2 | 12/2009 | Dos Remedios et al. |
| 8,570,866 | B2 | 10/2013 | Buckman et al. |

(Continued)

FOREIGN PATENT DOCUMENTS

| CN | 103051629 A | 4/2013 |
| CN | 110855570 A | 2/2020 |

(Continued)

OTHER PUBLICATIONS

Jiang S, CN-106170024-A Software-defined Network Based Source Data Processing System, 2016, 3 pages.

(Continued)

*Primary Examiner* — Joseph R Maniwang
(74) *Attorney, Agent, or Firm* — Shumaker & Sieffert, P.A.

(57) ABSTRACT

In an example, a validation system comprises processing circuitry having access to a storage device and is configured to obtain flow records indicative of packet flows among workloads deployed to a cluster of one or more computing devices configured with a network policy, wherein each flow record of the flow records indicates a corresponding packet flow was allowed or denied by the cluster; receive an updated network policy; determine whether a corresponding packet flow for a flow record of the flow records has a discrepancy with the updated network policy; and in response to determining the corresponding packet flow for the flow record of the flow records has a discrepancy with the updated network policy, output an indication of an error.

20 Claims, 14 Drawing Sheets

(56) References Cited

U.S. PATENT DOCUMENTS

| | | |
|---|---|---|
| 8,687,490 B2 | 4/2014 | Brown et al. |
| 8,811,423 B2 | 8/2014 | Rawlins et al. |
| 9,225,646 B2 | 12/2015 | Heinz et al. |
| 9,231,876 B2 | 1/2016 | Mir et al. |
| 9,252,972 B1 | 2/2016 | Dukes et al. |
| 9,571,394 B1 | 2/2017 | Sivaramakrishnan et al. |
| 9,647,937 B1 | 5/2017 | Dukes et al. |
| 9,942,148 B1 | 4/2018 | Sivaramakrishnan et al. |
| 10,148,509 B2 | 12/2018 | Rajagopalan et al. |
| 10,382,360 B2 | 8/2019 | Puhakka |
| 10,742,557 B1 | 8/2020 | Miriyala et al. |
| 10,742,690 B2 | 8/2020 | Miriyala et al. |
| 10,944,691 B1 | 3/2021 | Raut et al. |
| 10,958,582 B2 | 3/2021 | Adamczyk et al. |
| 10,999,251 B2 | 5/2021 | Miriyala et al. |
| 11,323,487 B1 | 5/2022 | Miriyala et al. |
| 11,870,642 B2 | 1/2024 | Miriyala et al. |
| 2006/0013136 A1 | 1/2006 | Goldschmidt et al. |
| 2010/0188976 A1 | 7/2010 | Rahman et al. |
| 2014/0177634 A1 | 6/2014 | Jiang et al. |
| 2016/0315871 A1 | 10/2016 | Kwak et al. |
| 2018/0026893 A1 | 1/2018 | Jeuk et al. |
| 2018/0288002 A1 | 10/2018 | Petrick et al. |
| 2019/0268973 A1 | 8/2019 | Bull et al. |
| 2020/0137113 A1 | 4/2020 | Thomas |
| 2020/0137173 A1 | 4/2020 | Agarwal et al. |
| 2020/0322437 A1 | 10/2020 | Mardente et al. |
| 2020/0344127 A1 | 10/2020 | Rahman et al. |
| 2021/0243163 A1 | 8/2021 | Miriyala et al. |
| 2022/0279420 A1 | 9/2022 | Akkipeddi et al. |
| 2023/0104129 A1 | 4/2023 | Miriyala et al. |

FOREIGN PATENT DOCUMENTS

| | | |
|---|---|---|
| CN | 113114594 A | 7/2021 |
| EP | 2911347 A1 | 8/2015 |
| EP | 2765751 B1 | 6/2017 |
| EP | 3629533 A1 | 4/2020 |
| KR | 20150068317 A | 6/2015 |
| KR | 102082605 B1 | 5/2020 |
| KR | 20210016802 A | 2/2021 |
| WO | 2013184846 A1 | 12/2013 |
| WO | 2016001727 A1 | 1/2016 |

OTHER PUBLICATIONS

Bischoff et al., "illuminatio conceptual architecture", GitHub, Jun. 26, 2019, 2 pp., Retrieved from the Internet on Jul. 6, 2023 from URL: https://github.com/inovex/illuminatio/blob/master/docs/concept.md.

Juniper Networks, "Contrail Networking Cloud-Native User Guide", May 3, 2021, 263 pp.

KN et al., "Day One: Contrail DPDK vRouter", Juniper Networks, Jan. 21, 2021, 194 pp., Retrieved from: https://www.juniper.net/documentation/en_US/day-one-books/contrail-DPDK.pdf.

Song et al., "Day One: Building Containers With Kubernetes and Contrail", Juniper Networks, vol. 1, Nov. 2019, 283 pp., Retrieved from the Internet on Jul. 7, 2023 from URL: https://www.juniper.net/documentation/en_US/day-one-books/day-one-containers-kubernetes-contrail.pdf.

Extended Search Report from counterpart European Application No. 23183970.5 dated Apr. 4, 2024, 11 pp.

Hongxin et al., "Towards a Reliable SDN Firewall", USENIX the Advanced Computing Systems Association, Sep. 14, 2021, 2 pp.

NETWORK POLICY VALIDATION

RELATED APPLICATIONS

This application claims the benefit of U.S. Provisional Application No. 63/478,089, filed Dec. 30, 2022, the entire contents of which is incorporated herein by reference.

TECHNICAL FIELD

The disclosure relates to virtualized computing infrastructure and, more specifically, to network policies for a virtualized computing infrastructure.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such as virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques for validating network policies and identifying configuration anomalies are described. In some examples, a validation system for an SDN architecture system may automatically validate updated network policies against "golden traffic" flow records that represent an intended set of packet flows in the system. The golden traffic are the packet flows that occur when the system is configured with a fully deployed application, including workloads and network policies, at "Day 0". The policy controller may collect flow metadata corresponding to the packets flows (both allowed and denied) and store the flow metadata as flow records. By comparing the golden traffic flow records to updated network policies using an algorithm, the validation system can validate updated network policies.

In some examples, the validation system may apply a similar algorithm to identify any discrepancies between updated network policies and new flow records corresponding to packet flows in the system, after configuration of the updated network policies. By identifying discrepancies, i.e., allowed packet flows that should be denied according to the updated network policies or denied packet flows that should be allowed according to the updated network policies, the validation system can determine that configuration anomalies associated with components of the software-defined network are present in the system or that such components are not operating as intended.

The techniques may provide one or more technical advantages to realize at least one practical application. For example, the techniques may facilitate automated policy validation to facilitate continuous deployment and continuous integration with respect to the configuration of the SDN architecture to support distributed applications. In this way, the techniques may complement existing DevOps best practices used for application development and apply them to network policy automation for distributed application deployment and configuration. Existing schemes for verification involve manual review of the network policies prior to commit, which is unwieldy and unreliable particularly in the context of large-scale distributed applications, or they involve analyzing flow records collected after commit to determine whether traffic was unintentionally allowed/denied. Because flow records representative of communications among workloads of the distributed applications according to network policies are not available until the network policies have been pushed to the system, prior solutions that involve automated verification, however, require pushing changes to the network policies to the system. By contrast, by applying an algorithm involving previously-obtained golden traffic flow records, some aspects of techniques of this disclosure enable validation of network policies prior to commit. Overall, the techniques may reduce the need for manual network policy validation and validation of an SDN architecture system configuration.

In an example, a method comprises obtaining flow records indicative of packet flows among workloads deployed to a cluster of one or more computing devices configured with a network policy, wherein each flow record of the flow records indicates a corresponding packet flow was allowed or denied by the cluster; receiving an updated network policy; determining whether a corresponding packet flow for a flow record of the flow records has a discrepancy with the updated network policy; and in response to determining the corresponding packet flow for the flow record of the flow records has a discrepancy with the updated network policy, outputting an indication of an error.

In an example, a method comprises obtaining flow records indicative of packet flows among workloads deployed to a cluster of one or more computing devices configured with a network policy, wherein each flow record of the flow records indicates a corresponding packet flow was allowed or denied by the cluster; determining whether a corresponding packet flow for a flow record of the flow records has a discrepancy with the updated network policy; and in response to determining the corresponding packet flow for a flow record of the flow records has a discrepancy with the network policy, outputting an indication of an error.

In an example, a validation system comprises processing circuitry having access to a storage device and is configured to obtain flow records indicative of packet flows among workloads deployed to a cluster of one or more computing devices configured with a network policy, wherein each flow record of the flow records indicates a corresponding packet flow was allowed or denied by the cluster; receive an updated network policy; determine whether a corresponding packet flow for a flow record of the flow records has a discrepancy with the updated network policy; and in response to determining the corresponding packet flow for the flow record of the flow records has a discrepancy with the updated network policy, output an indication of an error.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the description and figures.

DETAILED DESCRIPTION

Figure 1:
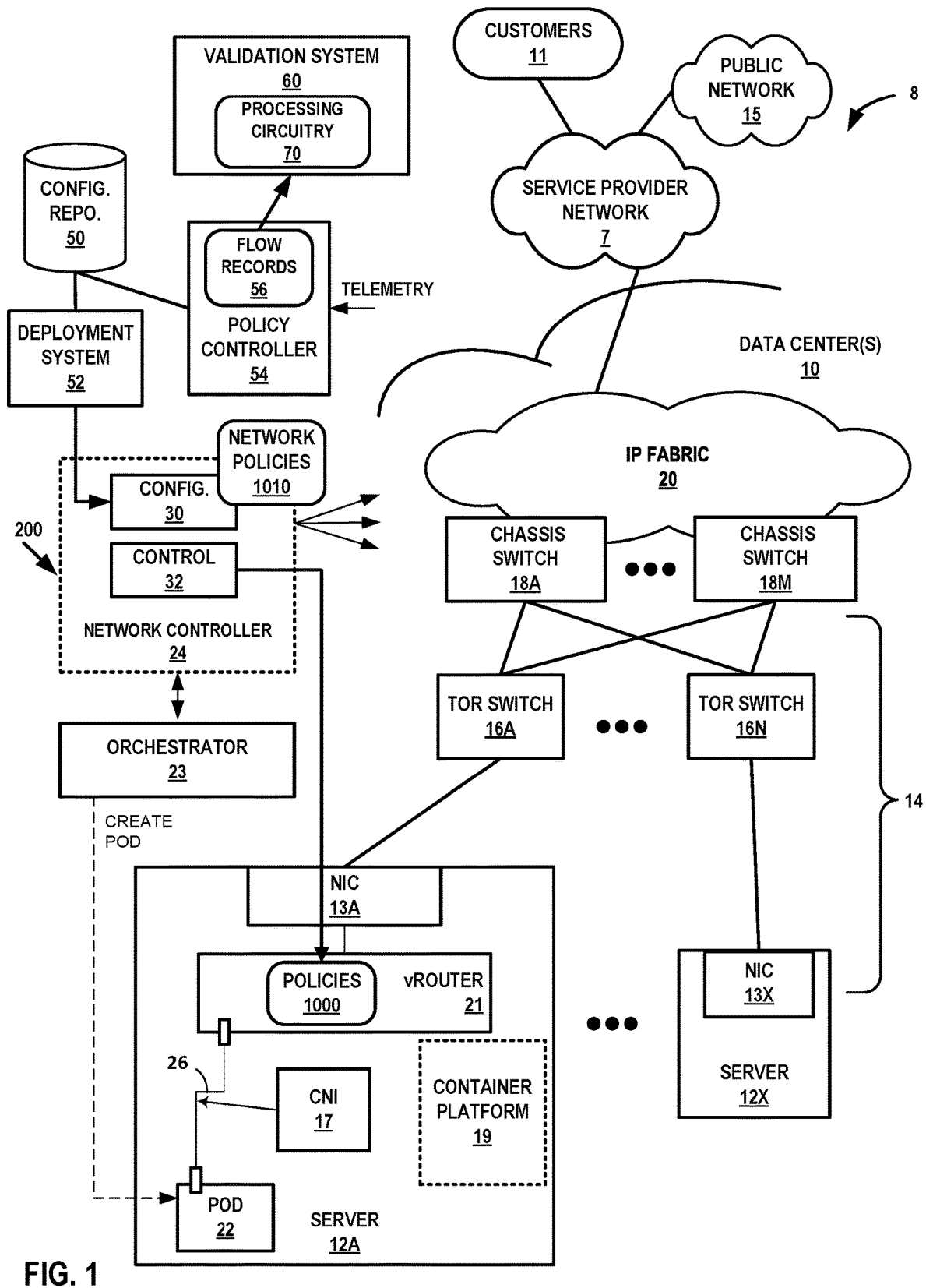
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. Current implementations of software-defined networking (SDN) architectures for virtual networks present challenges for cloud-native adoption due to, e.g., complexity in life cycle management, a mandatory high resource analytics component, scale limitations in configuration modules, and no command-line interface (CLI)-based (kubectl-like) interface. Computing infrastructure 8 includes a cloud-native SDN architecture system (or more simply "SDN architecture"), described herein, that addresses these challenges and modernizes for the telco cloud-native era. Example use cases for the cloud-native SDN architecture include 5G mobile networks as well as cloud and enterprise cloud-native use cases. An SDN architecture may include data plane elements implemented in compute nodes (e.g., servers 12) and network devices such as routers or switches, and the SDN architecture may also include an SDN controller (e.g., network controller 24) for creating and managing virtual networks. The SDN architecture configuration and control planes are designed as scale-out cloud-native software with a container-based microservices architecture that supports in-service upgrades.

As a result, the SDN architecture components are microservices and, in contrast to existing network controllers, the SDN architecture assumes a base container orchestration platform to manage the lifecycle of SDN architecture components. A container orchestration platform is used to bring up SDN architecture components; the SDN architecture uses cloud native monitoring tools that can integrate with customer provided cloud native options; the SDN architecture provides a declarative way of resources using aggregation APIs for SDN architecture objects (i.e., custom resources). The SDN architecture upgrade may follow cloud native patterns, and the SDN architecture may leverage Kubernetes constructs such as Multus, Authentication & Authorization, Cluster API, KubeFederation, KubeVirt, and Kata containers. The SDN architecture may support data plane development kit (DPDK) pods, and the SDN architecture can extend to support Kubernetes with virtual network policies and global security policies.

For service providers and enterprises, the SDN architecture automates network resource provisioning and orchestration to dynamically create highly scalable virtual networks and to chain virtualized network functions (VNFs) and physical network functions (PNFs) to form differentiated service chains on demand. The SDN architecture may be integrated with orchestration platforms (e.g., orchestrator 23) such as Kubernetes, OpenShift, Mesos, OpenStack, VMware vSphere, and with service provider operations support systems/business support systems (OSS/BSS).

The SDN architecture described herein implements a firewall policy framework. The firewall policy framework supports use of tags to aid in the simplification and abstraction of container workloads, such as Kubernetes pods. The firewall policy framework allows decoupling of routing from security policies and provides multi-dimension segmentation and policy portability while significantly enhancing user visibility and analytics functions. The use of tags by the firewall policy framework may achieve multi-dimension traffic segmentation among various entities, and with security features. Tags are key-value pairs associated with different entities in the deployment. Tags can be pre-defined or custom defined.

In some container orchestration platforms, such as Kubernetes, a network policy is pod-specific and applies to a pod or a group of pods. The network policy is a specification of how groups of pods are allowed to communicate with each other and other network endpoint workloads. Network policy resources use labels to select pods and define rules which specify what traffic is allowed to the selected pods. In Kubernetes:
- A network policy can define traffic rules for a pod at the ingress, egress, or both directions. By default, a network policy is applied to the ingress direction, if no direction is explicitly specified.
- When a network policy is applied to a pod, the policy must have explicit rules to specify an allowlist of permitted traffic in the ingress and egress directions. All traffic that does not match the allowlist rules are denied and dropped.
- Multiple network policies can be applied on any pod. Traffic matching any one of the network policies must be permitted.
- A network policy acts on connections rather than individual packets. For example, if traffic from pod A to pod B is allowed by the configured policy, then the return packets for that connection from pod B to pod A are also allowed, even if the policy in place does not allow pod B to initiate a connection to pod A.
- Ingress Policy: An ingress rule consists of the identity of the source and the protocol: port type of traffic from the source that is allowed to be forwarded to a pod. The identity of the source can be of the following types:
  - Classless Interdomain Routing (CIDR) block-If the source IP address is from the CIDR block and the traffic matches the protocol:port, then traffic is forwarded to the pod.
  - Kubernetes namespaces-Namespace selectors identify namespaces, whose pods can send the defined protocol: port traffic to the ingress pod.
  - Pods-Pod selectors identify the pods in the namespace corresponding to the network policy, that can send matching protocol: port traffic to the ingress pods.
- Egress Policy: This specifies an allowlist CIDR to which a particular protocol:port type of traffic is permitted from the pods targeted by the network policy. The identity of the destination can be of the following types:
  - CIDR block-If the destination IP address is from the CIDR block and the traffic matches the protocol:port, then traffic is forwarded to the destination.
  - Kubernetes namespaces-Namespace selectors identify namespaces, whose pods can send the defined protocol: port traffic to the egress pod.
  - Pods-Pod selectors identify the pods in the namespace corresponding to the network policy, that can receive matching protocol: port traffic from the egress pods.

The above techniques described with respect to a pod may be applied to other types of workloads and workload deployment structures for other container orchestration platforms.

Kubernetes network policies and the SDN architecture may be different in terms of the semantics in which network policy is specified in each. The key to efficient implementation of a Kubernetes network policy through an SDN architecture firewall policy is in mapping the corresponding configuration constructs between these two entities, examples of which are as follows:
- Label→Custom Tag (one for each label)
- Namespace→Custom Tag (one for each namespace)
- Network Policy→Firewall Policy (one firewall policy per Network Policy)
- Rule Firewall Rule→(one firewall rule per network policy rule)
- CIDR Rules→Address Group
- Cluster Default→Application Policy Set Resolving Kubernetes network policy labels is straightforward. The representation of pods in a firewall policy is exactly the same as in the corresponding Kubernetes network policy. A firewall policy deals with labels or tags in the terminology of the SDN architecture. It does not expand labels to IP addresses. For example, in the default namespace, if network policy podSelector specifies: role=db, then the corresponding firewall rule specifies the pods as (role=db && namespace=default). No other translations to pod IP address or otherwise are done.

If the same network policy also has namespaceSelector as namespace=myproject, then the corresponding firewall rule represents that namespace as (namespace=myproject). No other translations or rules representing pods in "myproject" namespace is done.

Similarly, each CIDR is represented by one rule. In essence, the Kubernetes network policy is translated 1:1 to a firewall policy. There is only one additional firewall rule created for each Kubernetes network policy. The purpose of that rule is to implement the implicit deny requirements of the network policy, and no other rule is created.

The cloud-based deployment and configuration enabled by the SDN architecture described herein may facilitate the automated validation of network policies for continuous deployment. Such network policies may be Kubernetes resources and/or may be firewall policies specific to the firewall policy framework implemented by an SDN architecture described in this disclosure.

In general, one or more data center(s) 10 provide an operating environment for applications and services for customer sites 11 (illustrated as "customers 11") having one or more customer networks coupled to the data center by service provider network 7. Each of data center(s) 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within any of data center(s) 10. For example, data center(s) 10 may host multiple tenants (customers) each associated with one or more virtual private networks (VPNs), each of which may implement one of customer sites 11.

Service provider network 7 offers packet-based connectivity to attached customer sites 11, data center(s) 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, each of data center(s) 10 may represent one of many geographically distributed network data centers, which may be connected to one another via service provider network 7, dedicated network links, dark fiber, or other connections. As illustrated in the example of FIG. 1, data center(s) 10 may include facilities that provide network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center(s) 10 such as one or more physical network functions (PNFs) or virtualized network functions (VNFs) may be included within the service provider network 7 core.

In this example, data center(s) 10 includes storage and/or compute servers (or "nodes") interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "compute nodes," "hosts," or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center(s) 10 may also include one or more physical network functions (PNFs) such as physical firewalls, load balancers, routers, route reflectors, broadband network gateways (BNGs), mobile core network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center(s) 10 is merely an example. Other switching architectures may have more or fewer switching layers, for instance. IP fabric 20 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple:<source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements, such as pods or virtual machines, by virtualizing resources of the server to provide some measure of isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., an of data center(s) 10. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a datacenter 10 gateway router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21 (illustrated as and also referred to herein as "vRouter 21"), virtual routers running in servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one virtual execution element present on the server 12.)

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. Virtual execution elements may represent and be referred to herein as application workloads or simply as "workload." As shown in FIG. 1, server 12A hosts one virtual network endpoint in the form of pod 22 having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of the physical NIC (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass a Contrail or Tungsten Fabric virtual router, Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by virtual router 21 of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by virtual router 21. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22), virtual router 21 attaches a tunnel encapsulation header indicating the virtual network for the packet to generate an encapsulated or "tunnel" packet, and virtual router 21 outputs the encapsulated packet via overlay tunnels for the virtual networks to a physical destination computing device, such as another one of servers 12. As used herein, virtual router 21 may execute the operations of a tunnel endpoint to encapsulate inner packets sourced by virtual network endpoints to generate tunnel packets and decapsulate tunnel packets to obtain inner packets for routing to other virtual network endpoints.

In some examples, virtual router 21 may be a kernel-based and execute as part of the kernel of an operating system of server 12A.

In some examples, virtual router 21 may be a Data Plane Development Kit (DPDK)-enabled virtual router. In such examples, virtual router 21 uses DPDK as a data plane. In this mode, virtual router 21 runs as a user space application that is linked to the DPDK library (not shown). This is a performance version of a virtual router and is commonly used by telecommunications companies, where the VNFs are often DPDK-based applications. The performance of virtual router 21 as a DPDK virtual router can achieve ten times higher throughput than a virtual router operating as a kernel-based virtual router. The physical interface is used by DPDK's poll mode drivers (PMDs) instead of Linux kernel's interrupt-based drivers.

A user-I/O (UIO) kernel module, such as vfio or uio_pci_generic, may be used to expose a physical network interface's registers into user space so that they are accessible by the DPDK PMD. When NIC 13A is bound to a UIO driver, it is moved from Linux kernel space to user space and therefore no longer managed nor visible by the Linux OS. Consequently, it is the DPDK application (i.e., virtual router 21A in this example) that fully manages the NIC 13. This includes packets polling, packets processing, and packets forwarding. User packet processing steps may be performed by the virtual router 21 DPDK data plane with limited or no participation by the kernel (kernel not shown in FIG. 1). The nature of this "polling mode" makes the virtual router 21 DPDK data plane packet processing/forwarding much more efficient as compared to the interrupt mode, particularly when the packet rate is high. There are limited or no interrupts and context switching during packet I/O.

Additional details of an example of a DPDK vRouter are found in "DAY ONE: CONTRAIL DPDK vROUTER," 2021, Kiran K N et al., Juniper Networks, Inc., which is incorporated by reference herein in its entirety.

Computing infrastructure 8 implements an automation platform for automating deployment, scaling, and operations of virtual execution elements across servers 12 to provide virtualized infrastructure for executing application workloads and services. In some examples, the platform may be a container orchestration system that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes (a container orchestration system), Docker swarm, Mesos/Marathon, OpenShift, OpenStack, VMware, and Amazon ECS.

Elements of the automation platform of computing infrastructure 8 include at least servers 12, orchestrator 23, and network controller 24. Containers may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily container hosting devices of a cluster. For example, the Kubernetes platform uses the terms "cluster master" and "minion nodes," while the Docker Swarm platform refers to cluster managers and cluster nodes.

Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12 (also referred to as "compute nodes").

In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding example operations of a network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each of which is incorporated by reference as if fully set forth herein.

In general, orchestrator 23 controls the deployment, scaling, and operations of containers across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform. Example components of a Kubernetes orchestration system are described below with respect to FIG. 3.

Kubernetes operates using a variety of Kubernetes objects—entities which represent a state of a Kubernetes cluster. Kubernetes objects may include any combination of names, namespaces, labels, annotations, field selectors, and recommended labels. For example, a Kubernetes cluster may include one or more "namespace" objects. Each namespace of a Kubernetes cluster is isolated from other namespaces of the Kubernetes cluster. Namespace objects may include at least one of organization, security, and performance of a Kubernetes cluster. As an example, a pod may be associated with a namespace, consequently associating the pod with characteristics (e.g., virtual networks) of the namespace. This feature may enable a plurality of newly-created pods to organize by associating the pods with a common set of characteristics. A namespace can be created according to namespace specification data that defines characteristics of the namespace, including a namespace name. In one example, a namespace might be named "Namespace A" and each newly-created pod may be associated with a set of characteristics denoted by "Namespace A." Additionally, Kubernetes includes a "default" namespace. If a newly-created pod does not specify a namespace, the newly-created pod may associate with the characteristics of the "default" namespace.

Namespaces may enable one Kubernetes cluster to be used by multiple users, teams of users, or a single user with multiple applications. Additionally, each user, team of users, or application may be isolated within a namespace from every other user of the cluster. Consequently, each user of a Kubernetes cluster within a namespace operates as if it were the sole user of the Kubernetes cluster. Multiple virtual networks may be associated with a single namespace. As such, a pod that belongs to a particular namespace has the ability to access each virtual network of the virtual networks that is associated with the namespace, including other pods that serve as virtual network endpoints of the group of virtual networks.

In one example, pod 22 is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22 is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include System V semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19 for running containerized applications, such as those of pod 22. Container platform 19 receives requests from orchestrator 23 to obtain and host, in server 12A, containers. Container platform 19 obtains and executes the containers.

Container network interface (CNI) 17 configures virtual network interfaces for virtual network endpoints. The orchestrator 23 and container platform 19 use CNI 17 to manage networking for pods, including pod 22. For example, CNI 17 creates virtual network interfaces to connect pods to virtual router 21 and enables containers of such pods to communicate, via the virtual network interfaces, to other virtual network endpoints over the virtual networks. CNI 17 may, for example, insert a virtual network interface for a virtual network into the network namespace for containers in pod 22 and configure (or request to configure) the virtual network interface for the virtual network in virtual router 21 such that virtual router 21 is configured to send packets received from the virtual network via the virtual network interface to containers of pod 22 and to send packets received via the virtual network interface from containers of pod 22 on the virtual network. CNI 17 may assign a network address (e.g., a virtual IP address for the virtual network) and may set up routes for the virtual network interface. In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network.

CNI 17 may represent a library, a plugin, a module, a runtime, or other executable code for server 12A. CNI 17 may conform, at least in part, to the Container Network Interface (CNI) specification or the rkt Networking Proposal. CNI 17 may represent a Contrail, OpenContrail, Multus, Calico, cRPD, or other CNI. CNI 17 may alternatively be referred to as a network plugin or CNI plugin or CNI instance. Separate CNIs may be invoked by, e.g., a Multus CNI to establish different virtual network interfaces for pod 22.

CNI 17 may be invoked by orchestrator 23. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks. The CNI specification specifies a number of considerations for a conforming plugin ("CNI plugin").

Pod 22 includes one or more containers. In some examples, pod 22 includes a containerized DPDK workload that is designed to use DPDK to accelerate packet processing, e.g., by exchanging data with other components using DPDK libraries. Virtual router 21 may execute as a containerized DPDK workload in some examples.

Pod 22 is configured with virtual network interface 26 for sending and receiving packets with virtual router 21. Virtual network interface 26 may be a default interface for pod 22. Pod 22 may implement virtual network interface 26 as an Ethernet interface (e.g., named "eth0") while virtual router 21 may implement virtual network interface 26 as a tap interface, virtio-user interface, or other type of interface.

Pod 22 and virtual router 21 exchange data packets using virtual network interface 26. Virtual network interface 26 may be a DPDK interface. Pod 22 and virtual router 21 may set up virtual network interface 26 using vhost. Pod 22 may operate according to an aggregation model. Pod 22 may use a virtual device, such as a virtio device with a vhostuser adapter, for user space container inter-process communication for virtual network interface 26.

CNI 17 may configure, for pod 22, in conjunction with one or more other components shown in FIG. 1, virtual network interface 26. Any of the containers of pod 22 may utilize, i.e., share, virtual network interface 26 of pod 22.

Virtual network interface 26 may represent a virtual ethernet ("veth") pair, where each end of the pair is a separate device (e.g., a Linux/Unix device), with one end of the pair assigned to pod 22 and one end of the pair assigned to virtual router 21. The veth pair or an end of a veth pair are sometimes referred to as "ports". A virtual network interface may represent a macvlan network with media access control (MAC) addresses assigned to pod 22 and to virtual router 21 for communications between containers of pod 22 and virtual router 21. Virtual network interfaces may alternatively be referred to as virtual machine interfaces (VMIs), pod interfaces, container network interfaces, tap interfaces, veth interfaces, or simply network interfaces (in specific contexts), for instance.

In the example server 12A of FIG. 1, pod 22 is a virtual network endpoint in one or more virtual networks. Orchestrator 23 may store or otherwise manage configuration data for application deployments that specifies a virtual network and specifies that pod 22 (or the one or more containers therein) is a virtual network endpoint of the virtual network.

Orchestrator 23 may receive the configuration data from a user, operator/administrator, or other machine system, for instance.

As part of the process of creating pod 22, orchestrator 23 requests that network controller 24 create respective virtual network interfaces for one or more virtual networks (indicated in the configuration data). Pod 22 may have a different virtual network interface for each virtual network to which it belongs. For example, virtual network interface 26 may be a virtual network interface for a particular virtual network. Additional virtual network interfaces (not shown) may be configured for other virtual networks. Network controller 24 processes the request to generate interface configuration data for virtual network interfaces for the pod 22. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JavaScript Object Notation (JSON) format is below.

Network controller 24 sends interface configuration data to server 12A and, more specifically in some cases, to virtual router 21. To configure a virtual network interface for pod 22, orchestrator 23 may invoke CNI 17. CNI 17 obtains the interface configuration data from virtual router 21 and processes it. CNI 17 creates each virtual network interface specified in the interface configuration data. For example, CNI 17 may attach one end of a veth pair implementing management interface 26 to virtual router 21 and may attach the other end of the same veth pair to pod 22, which may implement it using virtio-user.

The following is example interface configuration data for pod 22 for virtual network interface 26.

```
[{
    //virtual network interface 26
    "id": "fe4bab62-a716-11e8-abd5-0cc47a698428",
    "instance-id":         "fe3edca5-a716-11e8-822c-
       0cc47a698428",
    "ip-address": "10.47.255.250",
    "plen": 12,
    "vn-id":            "56dda39c-5e99-4a28-855e-
       6ce378982888",
    "vm-project-id":      "00000000-0000-0000-0000-
       000000000000",
    "mac-address": "02:fe:4b:ab:62:a7",
    "system-name": "tapeth0fe3edca",
    "rx-vlan-id": 65535,
    "tx-vlan-id": 65535,
    "vhostuser-mode": 0,
    "v6-ip-address": "::",
    "v6-plen":,
    "v6-dns-server":"::",
    "v6-gateway":"::",
    "dns-server": "10.47.255.253",
    "gateway": "10.47.255.254",
    "author": "/usr/bin/contrail-vrouter-agent",
    "time": "426404:56:19.863169"
}]
```

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The term "invoke" may refer to the instantiation, as executable code, of a software component or module in memory for execution by processing circuitry.

Network controller 24 is a cloud-native, distributed network controller for software-defined networking (SDN) that is implemented using one or more configuration nodes 30 and one or more control nodes 32. Each of configuration nodes 30 may itself be implemented using one or more cloud-native, component microservices. Each of control nodes 32 may itself be implemented using one or more cloud-native, component microservices.

In some examples, and as described in further detail below, configuration nodes 30 may be implemented by extending the native orchestration platform to support custom resources for the orchestration platform for software-defined networking and, more specifically, for providing northbound interfaces to orchestration platforms to support intent-driven/declarative creation and managing of virtual networks by, for instance, configuring virtual network interfaces for virtual execution elements, configuring underlay networks connecting servers 12, configuring overlay routing functionality including overlay tunnels for the virtual networks and overlay trees for multicast layer 2 and layer 3.

Network controller 24, as part of the SDN architecture illustrated in FIG. 1, may be multi-tenant aware and support multi-tenancy for orchestration platforms. For example, network controller 24 may support Kubernetes Role Based Access Control (RBAC) constructs, local identity access management (IAM) and external IAM integrations. Network controller 24 may also support Kubernetes-defined networking constructs and advanced networking features like virtual networking, BGPaaS, networking policies, service chaining and other telco features. Network controller 24 may support network isolation using virtual network constructs and support layer 3 networking.

To interconnect multiple virtual networks, network controller 24 may use (and configure in the underlay and/or virtual routers 21) network policies, referred to as Virtual Network Policy (VNP) and alternatively referred to herein as Virtual Network Router or Virtual Network Topology. The VNP defines connectivity policy between virtual networks. A single network controller 24 may support multiple Kubernetes clusters, and VNP thus allows connecting multiple virtual networks in a namespace, Kubernetes cluster and across Kubernetes clusters. VNP may also extend to support virtual network connectivity across multiple instances of network controller 24.

Network controller 24 may enable multi layers of security using network policies. The Kubernetes default behavior is for pods to communicate with one another. In order to apply network security policies, the SDN architecture implemented by network controller 24 and virtual router 21 may operate as a CNI for Kubernetes through CNI 17. For layer 3, isolation occurs at the network level and virtual networks operate at L3. Virtual networks are connected by policy. The Kubernetes native network policy provides security at layer 4. The SDN architecture may support Kubernetes network policies. Kubernetes network policy operates at the Kubernetes namespace boundary. The SDN architecture may add custom resources for enhanced network policies. The SDN architecture may support application-based security. (These security policies can in some cases be based upon metatags to apply granular security policy in an extensible manner.) For layer 4+, the SDN architecture may in some examples support integration with containerized security devices and/or Istio and may provide encryption support.

Network controller 24, as part of the SDN architecture illustrated in FIG. 1, may support multi-cluster deployments, which is important for telco cloud and high-end enterprise use cases. The SDN architecture may support multiple Kubernetes clusters, for instance. A Cluster API can be used to support life cycle management of Kubernetes clusters. KubefedV2 can be used for configuration nodes 32 federation across Kubernetes clusters. Cluster API and KubefedV2 are optional components for supporting a single instance of a network controller 24 supporting multiple Kubernetes clusters.

The SDN architecture may provide insights at infrastructure, cluster, and application using web user interface and telemetry components. Telemetry nodes may be cloud-native and include microservices to support insights.

As a result of the above features and others that will be described elsewhere herein, computing infrastructure 8 implements an SDN architecture that is cloud-native and may present one or more of the following technical advantages. For example, network controller 24 is a cloud-native, lightweight distributed application with a simplified installation footprint. This also facilitates easier and modular upgrade of the various component microservices for configuration node(s) 30 and control node(s) 32 (as well as any other components of other example of a network controller described in this disclosure). The techniques may further enable optional cloud-native monitoring (telemetry) and user interfaces, a high-performance data plane for containers using a DPDK-based virtual router connecting to DPDK-enabled pods, and cloud-native configuration management that in some cases leverages a configuration framework for existing orchestration platforms, such as Kubernetes or Openstack. As a cloud-native architecture, network controller 24 is a scalable and elastic architecture to address and support multiple clusters. Network controller 24 in some cases may also support scalability and performance requirements for key performance indicators (KPIs).

An SDN architecture having features and technical advantages such as those described herein can be used to implement cloud-native telco clouds to support, for instance, 5G mobile networking (and subsequent generations) and edge computing, as well as enterprise Kubernetes platforms including, for instance, high performance cloud-native application hosting. Telco cloud applications are rapidly moving towards containerized, cloud-native approaches. 5G fixed and mobile networks are driving the requirement to deploy workloads as microservices with significant disaggregation, particularly in the 5G Next-Gen RAN (5GNR). The 5G NextGen Core (5GNC) is likely to be deployed as a set of microservices-based applications corresponding to each of the different components described by the 3GPP. When viewed as groups of microservices delivering applications, it 5GNC is likely to be a highly complex combination of pods with complex networking, security, and policy requirements. The cloud-native SDN architecture described herein, having well-defined constructs for networking, security, and policy, can be leveraged for this use case. Network controller 24 may provide the relevant APIs to be able to create these complex constructs.

Likewise, the user plane function (UPF) within the 5GNC will be an ultra-high-performance application. It may be delivered as a highly distributed set of high-performance pods. The SDN architecture described herein may be able to offer very high throughput data plane (both in terms of bits per section (bps) and packets per second (pps)). Integration with a DPDK virtual router with recent performance enhancements, eBPF, and with SmartNIC will be assist with achieving the throughput required. A DPDK-based virtual router is described in further detail in U.S. application Ser. No. 17/649,632, filed Feb. 1, 2022, entitled "CONTAINERIZED ROUTER WITH VIRTUAL NETWORKING", which is incorporated herein by reference in its entirety.

High performance processing is likely to be also relevant in the GiLAN as workloads there are migrated from more traditional virtualized workloads to containerized microservices. In the data plane of both the UPF and the GiLAN services, such as GiLAN firewall, intrusion detection and prevention, virtualized IP multimedia subsystem (vIMS) voice/video, and so forth, the throughput will be high and sustained both in terms of bps and pps. For the control plane of 5GNC functions, such as Access and Mobility Management Function (AMF), Session Management Function (SMF), etc., as well as for some GiLAN services (e.g., IMS), while the absolute volume of traffic in terms of bps may be modest, the predominance of small packets means that pps will remain high. In some examples, the SDN controller and data plane provide multi-million packets per second per virtual router 21, as implemented on servers 12. In the 5G radio access network (RAN), to move away from the proprietary vertically integrated RAN stacks provided by legacy radio vendors, Open RAN decouples the RAN hardware and software in a number of components including non-RT Radio Intelligent Controller (RIC), near-real-time RIC, centralized unit (CU) control plane and user plane (CU-CP and CU-UP), distributed unit (DU), and radio unit (RU). Software components are deployed on commodity server architectures supplemented with programmable accelerators where necessary. The SDN architecture described herein may support the O-RAN specifications.

Edge compute is likely to be primarily targeted at two different use cases. The first will be as a support for containerized telco infrastructure (e.g. 5G RAN, UPF, Security functions) and the second will be for containerized service workloads, both from the telco as well as from third parties such as vendors or enterprise customers. In both cases, edge compute is effectively a special case of the GiLAN, where traffic is broken out for special handling at highly distributed locations. In many cases, these locations will have limited resources (power, cooling, space). The SDN architecture described herein may be well-suited to support the requirement of a very lightweight footprint, may support compute and storage resources in sites remote from the associated control functions, and may be location-aware in the way in which workloads and storage are deployed. Some sites may have as few as one or two compute nodes delivering a very specific set of services to a highly localized set of users or other services. There is likely to be a hierarchy of sites where the central sites are densely connected with many paths, regional sites are multiply connected with two to four uplink paths and the remote edge sites may have connections to only one or two upstream sites. This calls for extreme flexibility in the way in which the SDN architecture may be deployed and the way (and location) in which tunneled traffic in the overlay is terminated and bound into the core transport network (SRv6, MPLS, etc.). Likewise, in sites that host telco cloud infrastructure workloads, the SDN architecture described herein may support specialized hardware (GPU, SmartNIC, etc.) required by high-performance workloads. There may also be workloads that require SR-IOV. As such, the SDN architecture may also support the creation of VTEPs at the ToR and linking that back into the overlay as VXLAN.

It is expected that there will be a mix of fully distributed Kubernetes micro clusters where each site runs its own master(s), and the SDN architecture may support Remote Compute-like scenarios.

For use cases involving an enterprise Kubernetes platform, high-performance cloud-native applications power financial services platforms, online gaming services, and hosted application service providers. The cloud platforms that deliver these applications must provide high performance, resilience against failures, with high security and visibility. The applications hosted on these platforms tend to be developed in-house. The application developers and platform owners work with the infrastructure teams to deploy and operate instances of the organization's applications. These applications tend to require high throughput (>20 Gbps per server), and low latency. Some applications may also use multicast for signaling or payload traffic. Additional hardware, and network infrastructure may be leveraged to ensure availability. Applications and microservices will leverage namespaces within the cluster for partitioning. Isolation between namespaces is critical in high-security environments. While default deny policies are the standard posture in zero-trust application deployment environments, additional network segmentation using virtual routing and forwarding instances (VRFs) adds an additional layer of security and allows for the use of overlapping network ranges. Overlapping network ranges are a key requirement for managed application hosting environments, which tend to standardize on a set of reachable endpoints for all managed customers.

Complex microservice-based applications tend to leverage complex network filters. The SDN architecture described herein may deliver high performance firewall filtering at scale. Such filtering can exhibit consistent forwarding performance, with less latency degradation regardless of rule-set length or sequence. Some customers may also have some of the same regulatory pressures as telcos with respect to the separation of applications, not just at the network layer, but also in the kernel. Financials, but also others have the requirement for data plane encryption, particularly when running on public cloud. In some examples, the SDN architecture described herein may include features for satisfying these requirements.

In some examples, the SDN architecture may provide GitOps-friendly UX for strict change management controls, auditing and reliability of making changes in production several times per day, even hundreds of times per day when the SDN architecture is automated through an application dev/test/stage/prod continuous integration/continuous development (CI/CD) pipeline.

In accordance with techniques of this disclosure, system 8 includes a deployment system 52, policy controller 54, a configuration repository 50, and a validation system 60 for validation of network policies. Configuration repository 50 may implement one or more repositories, such as a Git repository, to store and manage configuration data for application deployments to SDN architecture 200. Configuration repository 50 may include one or more storage systems for storing the configuration data. Configuration repository 50 may include software for tracking the creation and modification of the configuration data to facilitate collaborative updates and development of configuration for applications being deployed using configuration repository 50. The software for configuration repository 50 may implement version control and development branches, in which a repository having committed configuration data may be branched to create alternative configuration data in another "branch" using a subsequent commit that includes updates to the configuration data of the earlier commit. Configuration repository 50 may therefore store multiple sets of configuration data for the same application, each set of configuration data representing a different configuration and resulting in differing operation of the application in SDN architecture 200. A given set of configuration data for an application may be considered a source of truth for defining a desired application state for the application. An application may be a set of workloads deployable to computing infrastructure, and SDN architecture 200 may be configured using network controller 24 to implement network communications among workloads of the application. Configuration data for an application can include, e.g., Kubernetes manifests, network policies (whether included in Kubernetes manifests or defined elsewhere), pod descriptions, network configurations, and other configuration data for defining operation of SDN architecture 200 for supporting the application, in particular for supporting network communications among workloads of the application.

Deployment system 52 leverages configuration repository to configure applications deployed to computing infrastructure 8 and, more specifically, to SDN architecture 200. Deployment system 52 may facilitate continuous delivery (CD) for applications deployable to SDN architecture 200. Deployment system 52 may, for instance, automate deployment of configuration data for an application from configuration repository 50. Deployment system 52 may track updates to configuration data in configuration repository 50 and, in response to an update, may obtain and provide the updated configuration data to configuration nodes 30 of network controller 24 to configure SDN architecture 200 for the application. In some examples, deployment system 52 is integrated with orchestrator 23.

In some cases, the configuration data is integrated with the application deployment in configuration repository 50, enabling consistent push-button deployment of both application workloads and SDN architecture 200 configuration to computing infrastructure 8. In such cases, configuration repository 50 thereby operates as a full application deployment repository.

Figure 10:
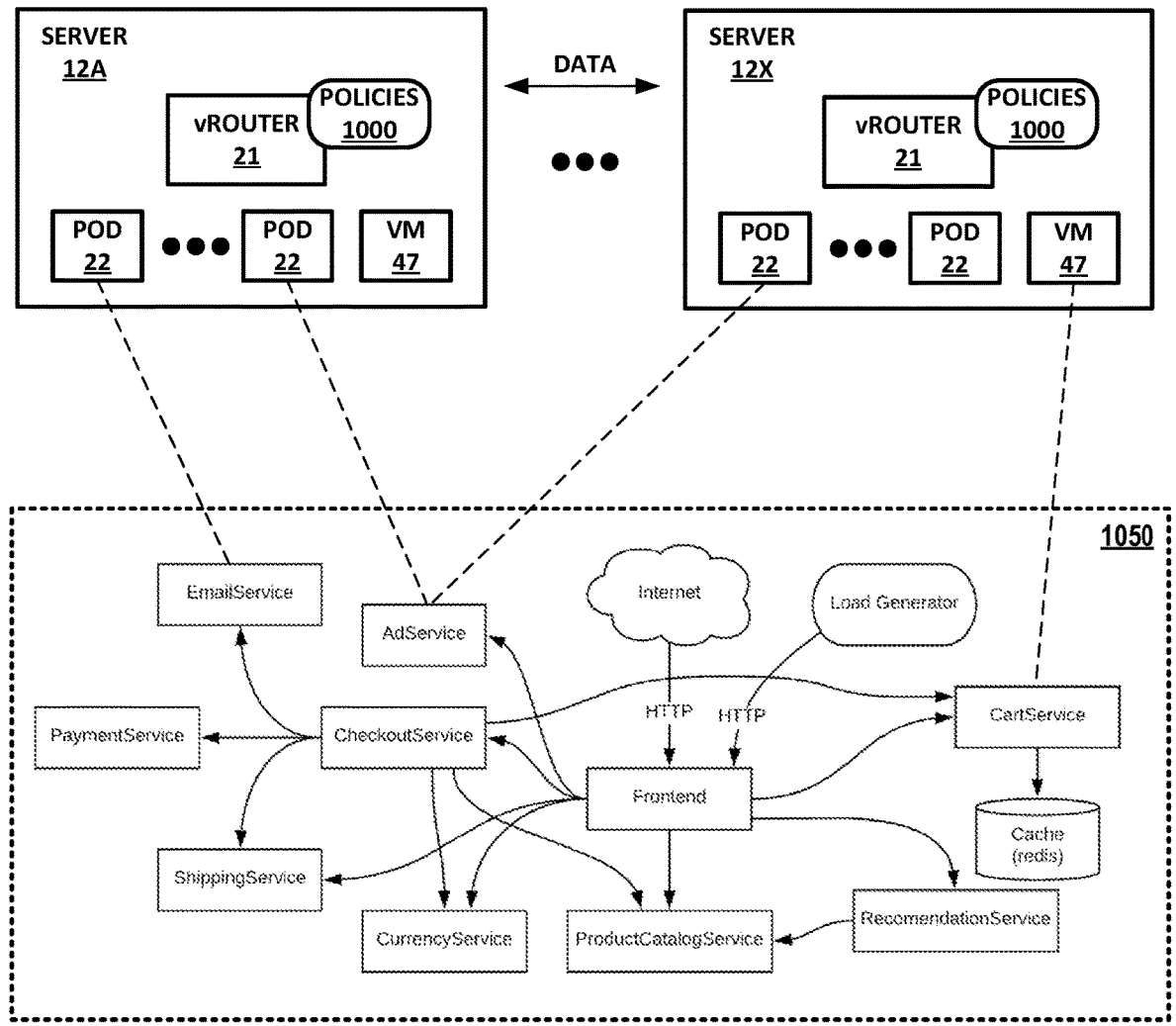
FIG. 10 is a block diagram illustrating an example distributed application deployed to the data plane for an SDN architecture system, in accordance with techniques of this disclosure.

FIG. 10 is a block diagram illustrating an example distributed application 1050 deployed to the data plane for SDN architecture 200, in accordance with techniques of this disclosure. Application 1050 includes a variety of microservice components, e.g., "EmailService" and "AdService," that are deployed using pods 22 to servers 12. The microservice components are intended to communicate with one another in the manner illustrated. For example, CartService receives service requests from CheckoutService and Frontend, and CartService issues service requests to Cache. Network policies for application 1050 allow the deployed pods to communicate in such manner as to facilitate the intended communications among microservice components included in those pods. For instance, a pod 22 on server 12A may include a container of CheckoutService and should be allowed to communicate with a pod 22 on server 12X that includes a container of CartService. An application can include components deployed using pods, virtual machines, bare metal server processes, or using a combination thereof, all of which may be referred to using the generic term "workloads."

Returning now to FIG. 1, as described in further detail below, virtual routers 21 apply configured policies 1000. Policies 1000 may be implemented using one or more firewall rules downloaded to virtual routers 21 by control nodes 32, for example.

In some examples, the application deployment may be to a different SDN architecture than the one used to generate network policies 1010. For example, a testbed SDN architecture may be used to generate network policies 1010, while a production SDN architecture may run the production application and be configured with network policies 1010.

In some cases, network policies 1010 represent network policies for orchestrator 23. For example, network policies 1010 may be Kubernetes native resources, i.e., Kubernetes network policies. Configuration nodes 30 may convert network policies 1010, which may represent native resources for the orchestrator 23, to custom resources for SDN architecture configuration. Such custom resources may be, for instance, firewall policies understood by the virtual routers 21. This process is described in further detail below. Policies 1000 may represent SDN architecture configuration objects instantiated in virtual routers 21 and corresponding to the custom resources, in such examples. Different virtual routers 21 operating on different servers 12 may implement a different set of policies, depending on which workloads are operating on the server on which the virtual router is located.

Policy controller 54 and deployment system 52 may each represent a separate computing system from SDN architecture 200. Each of policy controller 54 and deployment system 52 may include one or more applications executed by processing circuitry of servers or dedicated appliances. In some examples, policy controller 54 may include one or more applications executed by processing circuitry of servers 12. In some examples, deployment system 52 and policy controller 54 may be combined as a policy controller. Policy controller 54 and deployment system 52 may implemented in a public or private cloud.

Returning to FIG. 1, in accordance with techniques of this disclosure, system 8 includes a validation system 60, policy controller 54, and flow records 56 for automated validation of network policies. Flow records 56 may include a plurality of flow records representing all traffic flowing through data centers 10 (e.g., total number of bytes and packets sent, start and end time of the data flow, etc.). Policy controller 54 may obtain flow metadata with telemetry data from SDN architecture 200 and store the plurality of flow metadata as flow records in flow records 56. Additional information regarding example operation of policy controller 24 obtaining flow metadata is found in the description of steps 1102-1114 of FIG. 11 in U.S. patent application Ser. No. 17/657,613, filed Mar. 31, 2022, and entitled "Network Policy Generation for Continuous Deployment," which is incorporated by reference as if fully set forth herein.

The flow metadata is for packet flows among workloads of the distributed application. In some examples, the flow metadata may be session records of traffic statistics for packet flows processed by virtual routers 21 (e.g., for forwarding among workloads). Policy controller 54 may correlate the session records of traffic statistics for the packet flows into session records of traffic statistics for the workloads. The flow metadata indicates packet flows from workloads to other workloads. Policy controller 54 may store the flow metadata as flow records, which include a tag or label indicating whether the packet flow specified in the flow metadata was allowed or denied. Each of flow records 56 may include packet flow identifying information for identifying a packet flow originated within system 200 and data indicating whether the packet flow was allowed or denied by vRouters 21. As noted above, the data indicating whether the packet flow was allowed or denied may be a tag or label (e.g., "allowed"), an integer, a Boolean, or some other data. Packet flow identifying information may include overlay and/or underlay source or destination network addresses, source/destination ports, protocol information, other packet header field data, tags, application IDs, or other data for identifying a packet flow originated by one of the deployed workloads.

Validation system 60 includes processing circuitry 70, of one or more computing devices, and having access to one or more storage devices (not shown) storing executable instructions for a validation algorithm.

In some cases, validation system 60 leverages flow records 56 to generate a traffic profile (also referred to herein as "golden traffic" or "golden traffic profile") based on flow records collected during an initial deployment including configured network policies. The traffic profile is "golden" in the sense that any flows permitted are intended to be permitted, and any flows denied are intended to be denied. The golden traffic can be used by validation system 60 to identify subsequent discrepancies in the flows caused by changes to the network policies 1010 or changes to the cluster (e.g., adding a server 12 or updating the vrouter 21 code).

The flow records collected during an initial deployment may be flow records collected within a time period established by a user or a time period automatically set to generate a traffic profile (e.g., a day of operation, or a week of operation, or some other time period). The user may also select flow records collected within a specified time period to generate the traffic profile (e.g., generate a traffic profile comprising flow records collected on Monday from 8:00 AM to 6:00 PM).

A user using policy controller 54 may subsequently update network policies 1010 by modifying any of network policies 1010, creating a new policy for network policies 1010, or deleting any of network policies 1010. Updating network policies 1010 may inadvertently or unintentionally cause network traffic in system 200 to diverge from the golden traffic profile. For example, updated network policies 1010 may cause a packet flow that was denied (allowed) according to network policies 1010 set during the initial deployment to instead be allowed (denied) in system 200. This change in the treatment of the packet flow by system 200 may or may not be intended by the user.

Validation system 60 may validate updated network policies 1010 against the golden traffic profile generated from flow records 56, either prior to deployment of updated network policies 1010 or after deployment. Validation system 60 may process the flow records of the traffic profile to determine whether the updated network policies would cause system 200 to allow or deny the traffic. Validation system 60 applies the updated network policies to the traffic profile and flags any inconsistencies. Validation system 60 flags inconsistencies by comparing whether a flow record of the golden traffic profile indicating flows between endpoints as being allowed (denied) would instead be denied (allowed) according to the rules of the updated network policies. For example, validation system 60 may flag an inconsistency in response to determining that a flow record of the traffic profile is marked as allowed but that applying the rules of the updated network policies would cause a flow between the endpoints of the flow record of the traffic profile to instead be denied. Validation system 60 may output or store an indication of this inconsistency for review by the user.

In some cases, in response to validation system 60 validating network policies 1010 by determining that there are no inconsistencies with the golden traffic profile, validation system 60 may send an indication of validation to policy controller 54. In some cases, in response to validation system 60 outputting an indication of an inconsistency, a user may review the inconsistency and determine that it is intended. In other words, the updates to network policies 1010 result in (or will result in) changes to the operation of system 200 with respect to packet flows of the deployed application that are intended by the user. Example changes to the operation of system 200 may include denying (allowing) a packet flow that was allowed (denied) as part of the initial deployment. The user may provide user input to validation system 60 approving the inconsistency, and validation system 60 may responsively send an indication of validation to policy controller 54. Based on an indication of validation, policy controller 54 can push updated network policies 1010 to configuration repository 50 for configuration in system 200 by deployment system 52. In this way, validation system 60 can facilitate improved user trust in the operation of system 200 in view of updates to network policies 1010.

Figure 11A:
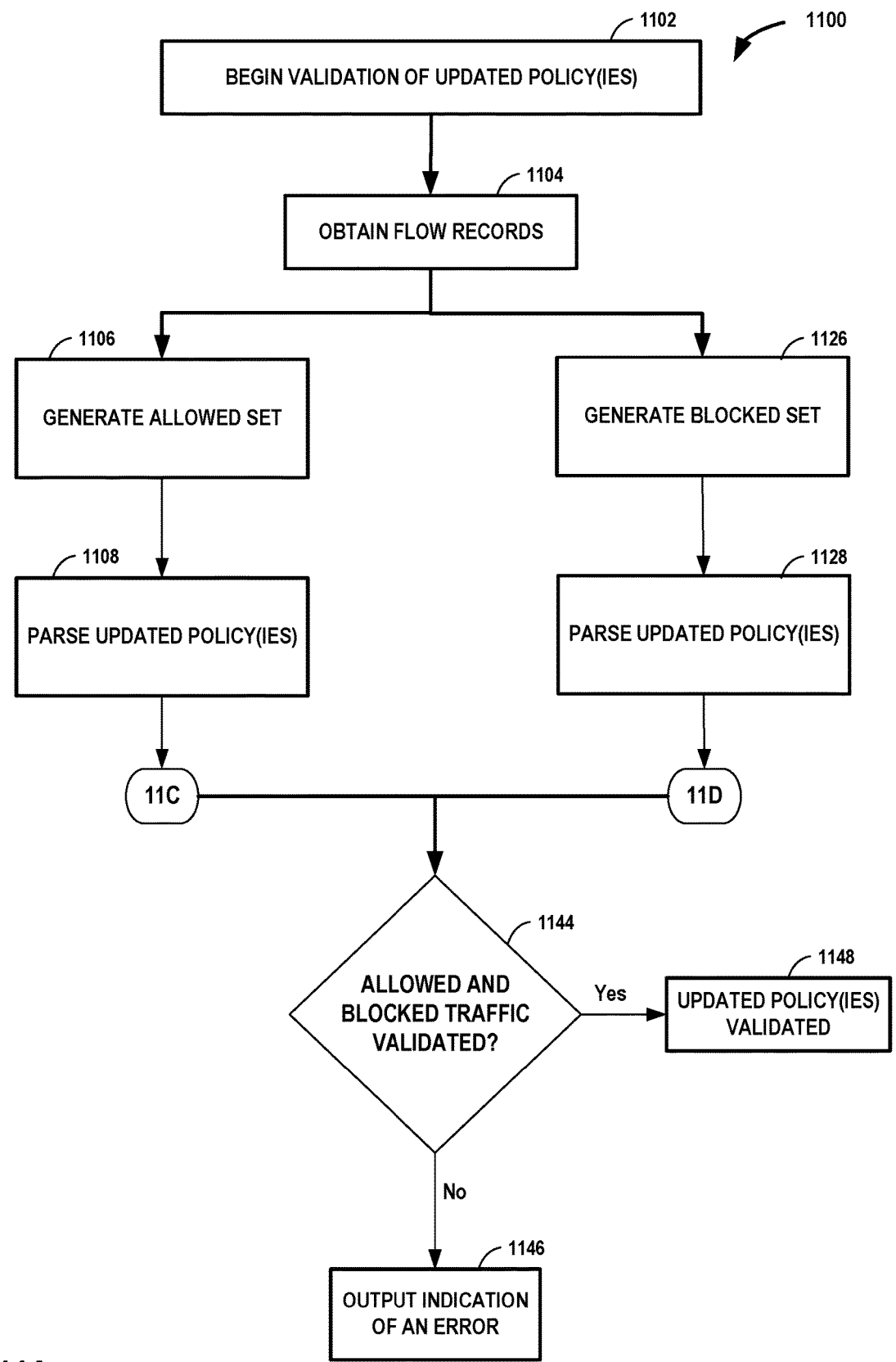
FIGS. 11A-11D depict flowcharts illustrating example modes of operation for an SDN architecture system, in accordance with techniques of this disclosure.
Figure 11B:
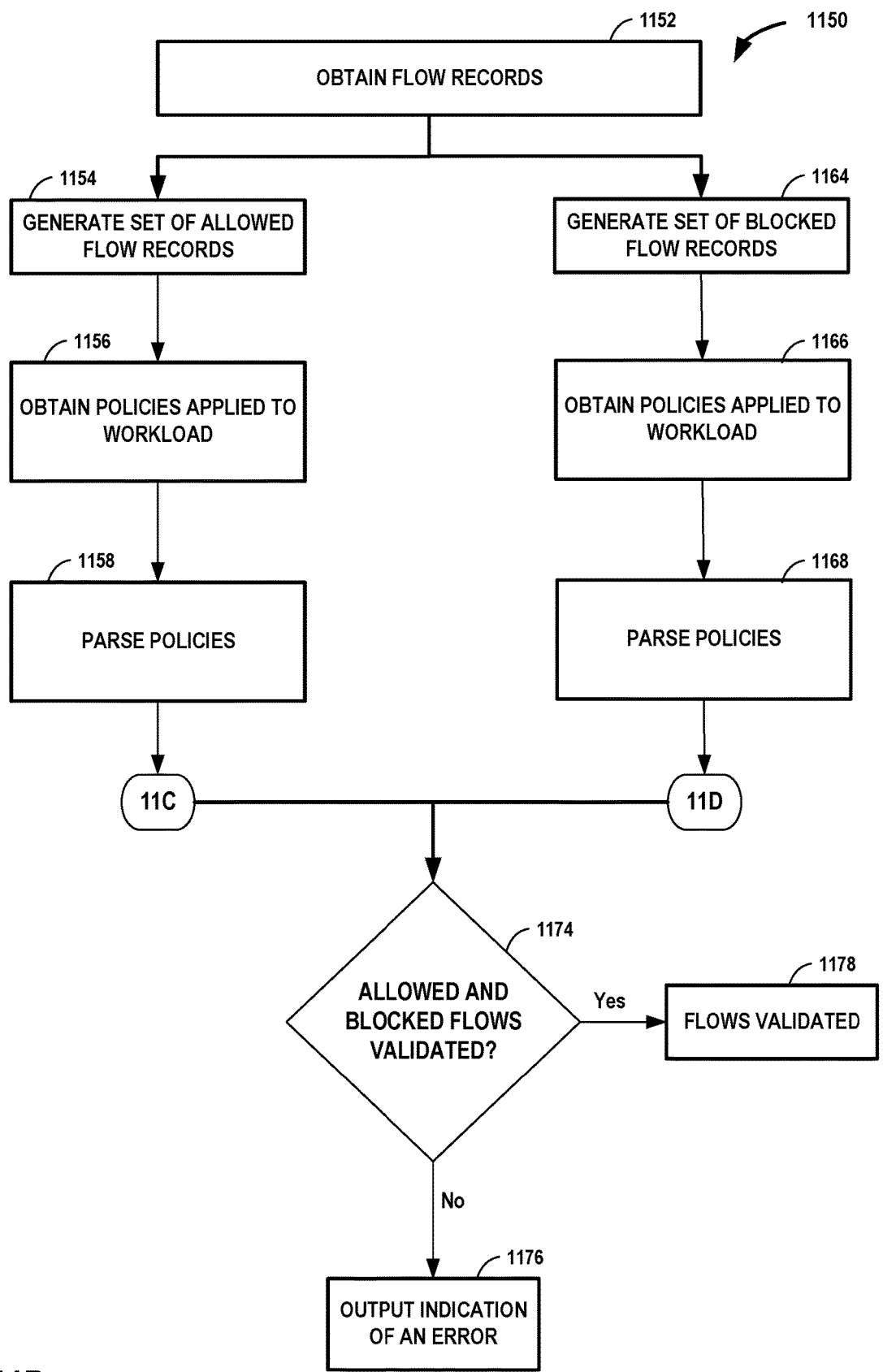
Figure 11C:
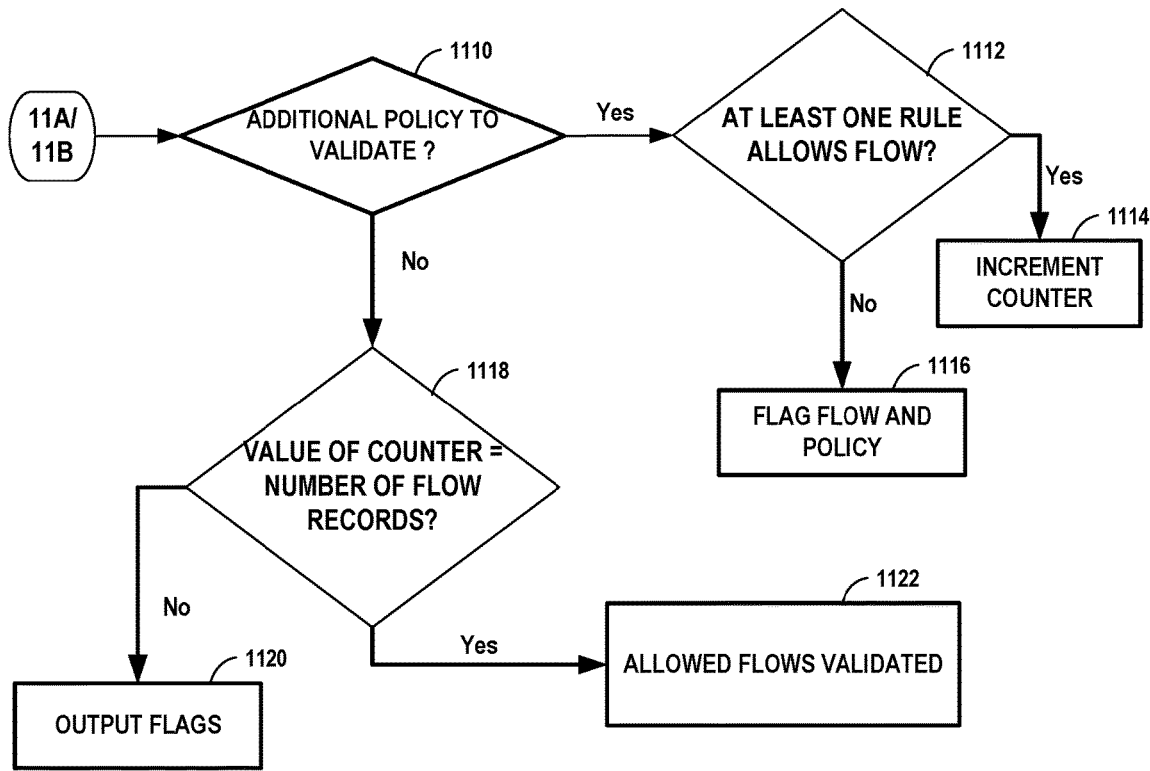
Figure 11D:
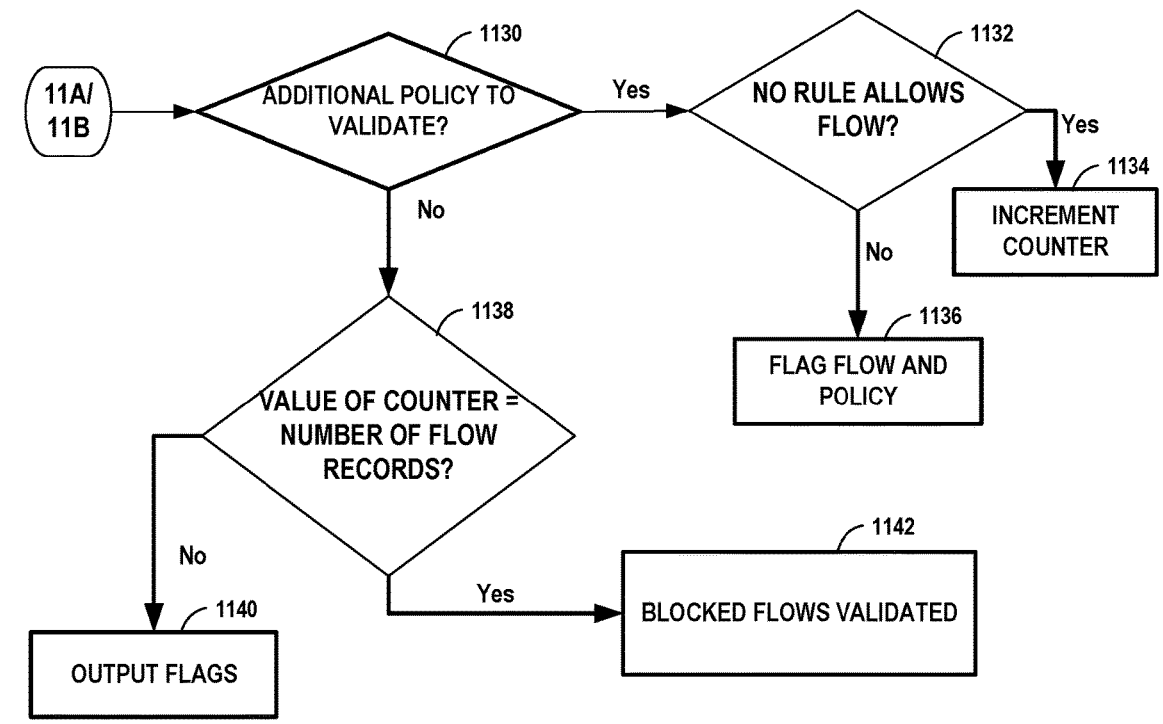

FIGS. 11A, 11C, and 11D depict flowcharts illustrating an example mode of operation 1100 for an SDN architecture. In this example, validation system 60 begins validation of one or more updated network policies (1102), which validation system 60 may obtain from policy controller 54. Policy controller 54 may obtain flow metadata and store the flow metadata as flow records in flow records 56 (1104). As discussed above, the obtained flow records may be referred to as a traffic profile and include flow records pertaining to a specific period of time. Validation system 60 may divide the flow records of the traffic profile into an "Allowed" set and a "Blocked" or denied set and process each set separately.

Validation system 60 may generate an allowed set of flow records by compiling the flow records of the traffic profile indicating a packet flow has been allowed (1106). For each flow record in the allowed set, the one or more updated network policies are parsed (1108). Validation system 60 may iteratively determine (1110 of FIG. 11C) whether at least one rule of the updated network policies allow the traffic (i.e., packet flow) represented in the flow record of the allowed set (1112). In response to validation system 60 determining that no rules of the updated network policy allow the traffic represented in a flow record of the allowed set (NO branch of 1112), validation system 60 flags the flow record and updated network policy (1116) and returns to step 1110. In response to validation system 60 determining that at least one rule of an updated policy does allow the traffic represented in the flow record of the allowed set (YES branch of 1112), validation system 60 may increment a counter to track instances where flow records of the allowed set and the updated network policy agree (1114) and returns to step 1110. After all the policies of the one or more updated policies have been checked for discrepancies, validation system 60 may validate the one or more updated network policies as a whole with respect to the allowed set of flow records by determining whether the value of the counter is equal to the number of flow records in the allowed set (1118). If validation system 60 determines the value of the counter is equal to the number of flow records in the allowed set (YES branch of 1118), validation system 60 may validate the one or more updated policies with respect to the allowed set of flow records (1122) and move to step 1144. If validation system 60 determines the value of the counter is not equal to the number of flow records (NO branch of 1118), validation system 60 may output the flagged traffic and policy (1120) and subsequently output an indication of a discrepancy (1146).

Validation system 60 may generate a blocked set of flow records by compiling the flow records of the traffic profile indicating a packet flow has been denied or blocked (1126). For each flow record in the blocked set, the one or more updated network policies are parsed (1128). Validation system 60 may iteratively determine (1130 of FIG. 11D) whether no rule of the updated network policies allow the traffic (i.e., packet flow) represented in the flow record of the blocked set (1132). In response to validation system 60 determining that at least one rule of an updated network policy allows the traffic represented in a flow record of the blocked set (NO branch of 1132), the flow record and updated network policy are flagged (1136) and returns to step 1130. The flagged updated network policy may be the network policy that allows the traffic. In response to validation system 60 determining that no rule of an updated policy does allow the traffic represented in the flow record of the blocked set (YES branch of 1132), validation system 60 may increment a counter to track instances where flow records of the blocked set and the updated network policy agree (1134) and returns to step 1130. After all the policies of the one or more updated policies have been checked for discrepancies, validation system 60 may validate the one or more updated network policies as a whole with respect to the blocked set of flow records by determining whether the value of the counter is equal to the number of flow records in the blocked set (1138). If validation system 60 determines the value of the counter is equal to the number of flow records in the blocked set (YES branch of 1138), validation system 60 may validate the one or more updated policies with respect to the blocked set of flow records (1142) and move to step 1144. If validation system 60 determines the value of the counter is not equal to the number of flow records (NO branch of 1138), validation system 60 may output the flagged traffic and policy (1140) and subsequently output an indication of an error (1146).

If validation system 60 has validated both the allowed and blocked sets of flow records (YES branch of 1144), validation system 60 may consider the updated network policies as validated and output an indication of validation that causes network controller 24 to push the updated network policies to vRouters 21 (1148). Steps 1106 and 1126 may be combined. Steps 1108 and 1128 may be combined.

The techniques described herein provide the advantage of automatic validation of network policies prior to the network policies being implemented by a cluster. Conventional network policy validation schemes involve manual review of network policies prior to committing the network policies to a cluster or analyzing flow records after committing network policies to a cluster. The techniques herein may allow a network administrator to establish a traffic profile or golden traffic to automatically validate updated network policies. The network administrator will no longer be required to manually validate network policies. The network administrator will also no longer have to commit network policies to a cluster prior to any automatic network policy validation scheme, thereby resulting in a faster network policy validation process that avoids potential security risks associated with committing network policies that have not been validated to a cluster.

In other instances, validation system 60 may validate whether network components (nodes, virtual routers, or controllers) are properly configured to enforce the network policies associated with the traffic profile. Validation system 60 may identify configuration anomalies of the network components by continuously or periodically validating flow records with network policies 1010. Validation system 60 may obtain flow records for a certain period of time (e.g, every day) with policy controller 54 and store the obtained flow records in flow records 56. Validation system 60 may obtain flow records in response to a new server being added to data center 10 or as a part of monitoring policy enforcement across all servers of data center 10.

FIGS. 11B, 11C, 11D depict flowcharts illustrating an example mode of operation 1150 for an SDN architecture. In this example, validation system 60 may identify configuration anomalies by validating traffic (i.e., packet flows) based on flow records policy controller 54 obtains periodically or within a specified time period (1152). Validation system 60 may separate the obtained flow records into a set of allowed flow records and a set of blocked flow records and validate each set separately.

Validation system 60 may generate a set of allowed flow records by compiling the obtained flow records that indicate a specified packet flow has been allowed (1154). Validation system 60 may obtain policies (e.g., network policies 1010) applied to the pod associated with the set of allowed flow records (1156). In examples where network policies are a Kubernetes resource, validation system 60 may obtain network policies 1010 from the Kubernetes API server using the Network Policy resource. Validation system 60 may then parse the obtained policies (1158) and perform steps 1110-1122 of FIG. 11C as discussed above. Steps 1156 and 1166 may be combined. Steps 1158 and 1168 may be combined.

Validation system 60 may generate a set of blocked flow records by compiling the obtained flow records that indicate a specified packet flow has been denied or blocked (1164). Validation system 60 may then obtain policies applied to the pod associated with the set of blocked flow records (1166). Validation system 60 may then parse the obtained policies (1168) and perform steps 1130-1142 of FIG. 11C as discussed above.

Figure 12:
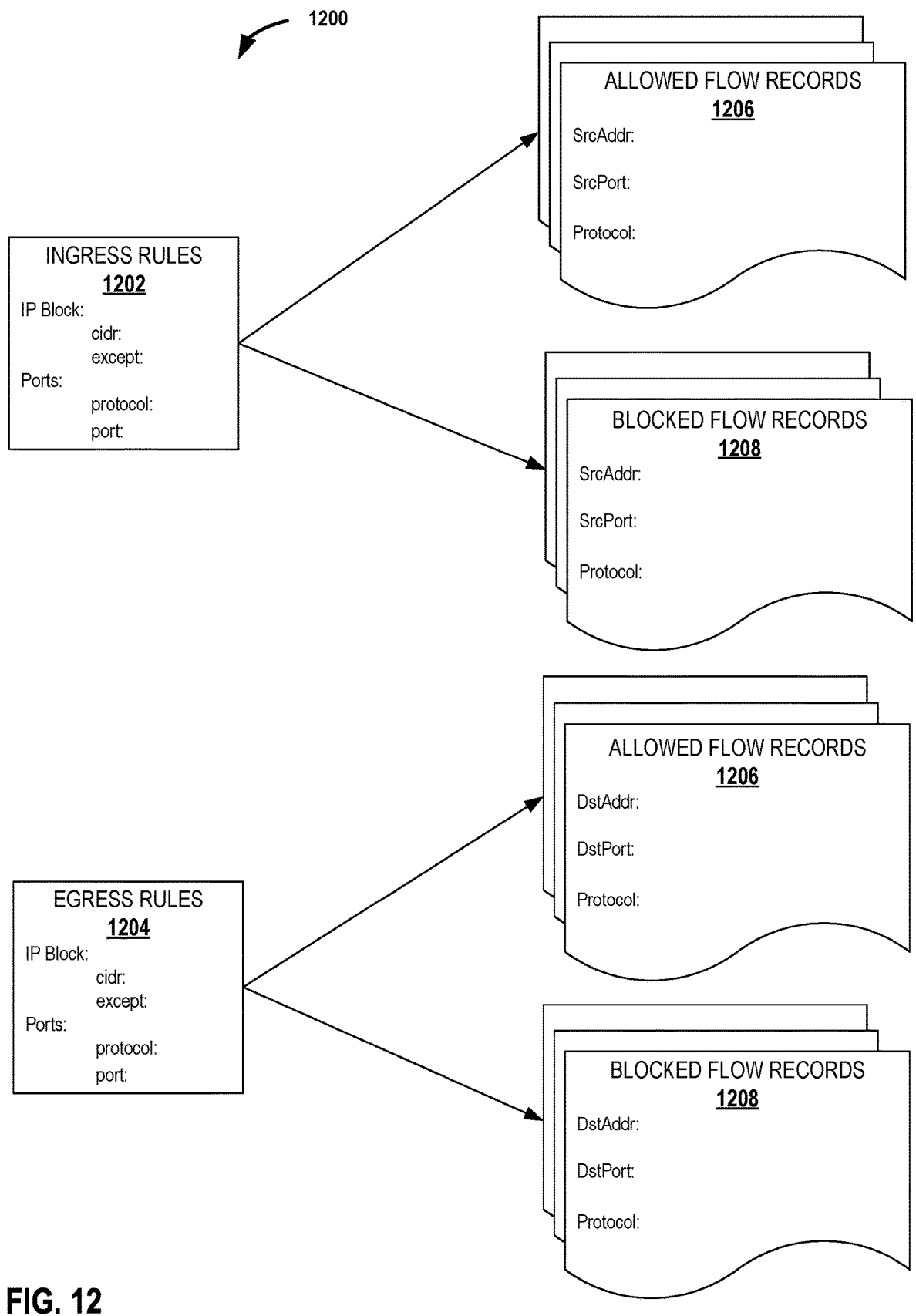
FIG. 12 is a block diagram illustrating an example operation for an SDN architecture system, in accordance with techniques of this disclosure.

FIG. 12 is a block diagram illustrating an example operation for an SDN architecture, in accordance with techniques of this disclosure. In the example of FIG. 12, a single policy may include lists of rules including ingress rules 1202 and egress rules 1204. Ingress rules 1202 is a list of allowed ingress rules specifying parameters corresponding to a source of a packet flow (e.g., blocked source IP addresses, allowed source IP addresses, allowed protocol, allowed port, etc.). Egress rules 1204 is a list of allowed egress rules specifying parameters corresponding to a destination of a packet flow (e.g., blocked destination IP addresses, allowed destination IP addresses, allowed protocol, allowed port, etc). After validation system 60 generates the sets of allowed flow records 1206 and blocked flow records 1208 based on allowed or denied indications in the flow records, validation system 60 may analyze whether the rules of a policy (e.g., ingress rules 1202 or egress rules 1204) adhere to the flow records. For example, validation system 60 may determine whether ingress rules 1202 has a corresponding rule (e.g., IP block exception, port, etc.) that matches the source address, source port, protocol, etc. of each flow record of allowed flow records 1206 and that the corresponding rule allows the flow record. In response to validation system 60 determining that ingress rules 1202 matches a flow record of allowed flow records 1206, validation system 60 may increment a counter as previously discussed. Validation system 60 may similarly analyze whether ingress rules 1202 has no rules that allow flow records of blocked flow records 1208, or whether the source address, source port, protocol, etc. of each flow record of blocked flow records 1208 is explicitly blocked by ingress rules 1202 (e.g., based on an IP block CIDR range). In addition, validation system 60 may conduct a similar analysis with egress rules 1204 to determine whether the network policy associated with egress rules 1204 would allow or block flow records corresponding to allowed flow records 1206 and blocked flow records 1208 respectively (e.g., based on destination address, destination port, protocol, etc.).

In some instances, validation system 60 may allow for manual creation of a whitelist of allowed traffic flows and a blacklist of blocked traffic flows. Validation system 60 may apply the whitelist of allowed traffic flows and the blacklist of blocked traffic flows to validate policies similar to how allowed flow records 1206 and blocked flow records 1208 are applied, as described above. For example, to validate updated network policies, validation system 60 may iteratively determine whether at least one rule (e.g., ingress rules 1202 or egress rules 1204) of the updated network policies allows the traffic (i.e., packet flow) represented in the user-generated whitelist of allowed flow records and blocks the traffic represented in the user-generated blacklist of blocked flow records. In response to validation system 60 determining that at least one rule of the updated network policies allows traffic represented in the whitelist of allowed flow records and blocks traffic represented in the blacklist of blocked flow records, validation system 60 may validate the updated network policies. In another example, validation system 60 may obtain policies (e.g., network policies 1010) applied to a pod associated with the user-generated whitelist of allowed traffic flows and/or the user-generated blacklist of blocked traffic flows. Validation system 60 may then parse the obtained policies. In response to validation system 60 parsing the obtained policies, validation system 60 may perform steps 1110-1122 of FIG. 11C with respect to the whitelist of allowed flow records and perform steps 1130-1142 of FIG. 11C with respect to the blacklist of blocked flow records.

The techniques described herein provide the advantage of fast validation of network traffic and automated identification of configuration anomalies. Conventional network policy validation schemes involve manual review of flow records to determine whether network traffic has been unintentionally allowed or denied. The techniques herein provide for automatic validation of packet flows for network traffic. In this way, the techniques herein ensure a cluster is operating according to established network policies through the validation of a cluster's configuration and operation. For example, if a discrepancy is automatically identified between the obtained flow records and established network policies, a network administrator may be able to correct the discrepancy by either fixing coding issues within a virtual router's code or resolving connectivity issues between a network controller and virtual router that is preventing the network controller from pushing the established network policies to the virtual router.

Figure 2:
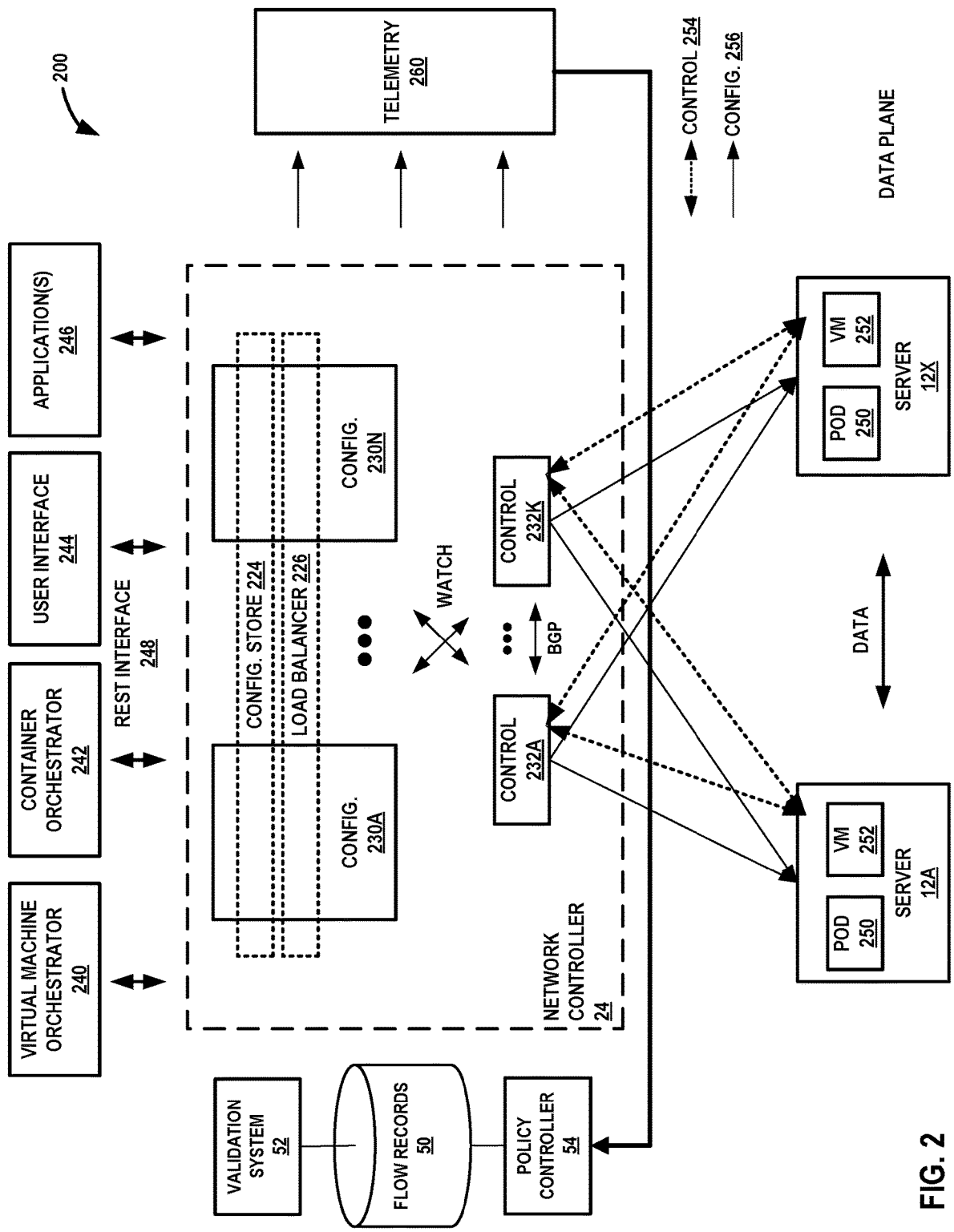
FIG. 2 is a block diagram illustrating an example of a cloud-native SDN architecture system for cloud native networking, in accordance with techniques of this disclosure.

FIG. 2 is a block diagram illustrating an example of a cloud-native SDN architecture for cloud native networking, in accordance with techniques of this disclosure. SDN architecture 200 is illustrated in a manner that abstracts underlying connectivity among the various components. In this example, network controller 24 of SDN architecture 200 includes configuration nodes 230A-230N ("configuration nodes" or "config nodes" and collectively, "configuration nodes 230") and control nodes 232A-232K (collectively, "control nodes 232"). Configuration nodes 230 and control nodes 232 may represent examples implementations of configuration nodes 30 and control nodes 32 of FIG. 1, respectively. Configuration nodes 230 and control nodes 232, although illustrated as separate from servers 12, may be executed as one or more workloads on servers 12.

Configuration nodes 230 offer northbound, REpresentation State Transfer (REST) interfaces to support intent-driven configuration of SDN architecture 200. Example platforms and applications that may be used to push intents to configuration nodes 230 include virtual machine orchestrator 240 (e.g., Openstack), container orchestrator 242 (e.g., Kubernetes), user interface 244, or other one or more application(s) 246. In some examples, SDN architecture 200 has Kubernetes as its base platform.

SDN architecture 200 is divided into a configuration plane, control plane, and data plane, along with an optional telemetry (or analytics) plane. The configuration plane is implemented with horizontally scalable configuration nodes 230, the control plane is implemented with horizontally scalable control nodes 232, and the data plane is implemented with compute nodes.

At a high level, configuration nodes 230 uses configuration store 224 to manage the state of configuration resources of SDN architecture 200. In general, a configuration resource (or more simply "resource") is a named object schema that includes data and/or methods that describe the custom resource, and an application programming interface (API) is defined for creating and manipulating the data through an API server. A kind is the name of an object schema. Configuration resources may include Kubernetes native resources, such as Pod, Ingress, Configmap, Service, Role, Namespace, Node, Networkpolicy, or LoadBalancer. In accordance with techniques of this disclosure, configuration resources also include custom resources, which are used to extend the Kubernetes platform by defining an application program interface (API) that may not be available in a default installation of the Kubernetes platform. In the example of SDN architecture 200, custom resources may describe physical infrastructure, virtual infrastructure, configurations, and/or other resources of SDN architecture 200. As part of the configuration and operation SDN architecture 200, various custom resources may be instantiated. Instantiated resources (whether native or custom) may be referred to as objects or as instances of the resource, which are persistent entities in SDN architecture 200 that represent an intent (desired state) and the status (actual state) of the SDN architecture 200. Configuration nodes 230 provide an aggregated API for performing operations on (i.e., creating, reading, updating, and deleting) configuration resources of SDN architecture 200 in configuration store 224. Load balancer 226 represents one or more load balancer objects that load balance configuration requests among configuration nodes 230. Configuration store 224 may represent one or more etcd databases. Configuration nodes 230 may be implemented using Nginx.

SDN architecture 200 may provide networking for both Openstack and Kubernetes. Openstack uses a plugin architecture to support networking. With virtual machine orchestrator 240 that is Openstack, the Openstack networking plugin driver converts Openstack configuration objects to SDN architecture 200 configuration objects (resources). Compute nodes run Openstack nova to bring up virtual machines.

With container orchestrator 242 that is Kubernetes, SDN architecture 200 functions as a Kubernetes CNI. As noted above, Kubernetes native resources (pod, services, ingress, external load balancer, etc.) may be supported, and SDN architecture 200 may support custom resources for Kubernetes for advanced networking and security for SDN architecture 200.

Configuration nodes 230 offer REST watch to control nodes 232 to watch for configuration resource changes, which control nodes 232 effect within the computing infrastructure. Control nodes 232 receive configuration resource data from configuration nodes 230, by watching resources, and build a full configuration graph. A given one of control nodes 232 consumes configuration resource data relevant for the control nodes and distributes required configurations to the compute nodes (servers 12) via control interfaces 254 to the control plane aspect of virtual router 21 (i.e., the virtual router agent—not shown in FIG. 1). Any of control nodes 232 may receive only a partial graph, as is required for processing. Control interfaces 254 may be XMPP. The number of configuration nodes 230 and control nodes 232 that are deployed may be a function of the number of clusters supported. To support high availability, the configuration plane may include 2N+1 configuration nodes 230 and 2N control nodes 232.

Control nodes 232 distributes routes among the compute nodes. Control node 232 uses internal Border Gateway Protocol (iBGP) to exchange routes among control nodes 232, and control nodes 232 may peer with any external BGP supported gateways or other routers. Control nodes 232 may use a route reflector.

Pods 250 and virtual machines 252 are examples of workloads that may be deployed to the compute nodes by virtual machine orchestrator 240 or container orchestrator 242 and interconnected by SDN architecture 200 using one or more virtual networks.

Figure 3:
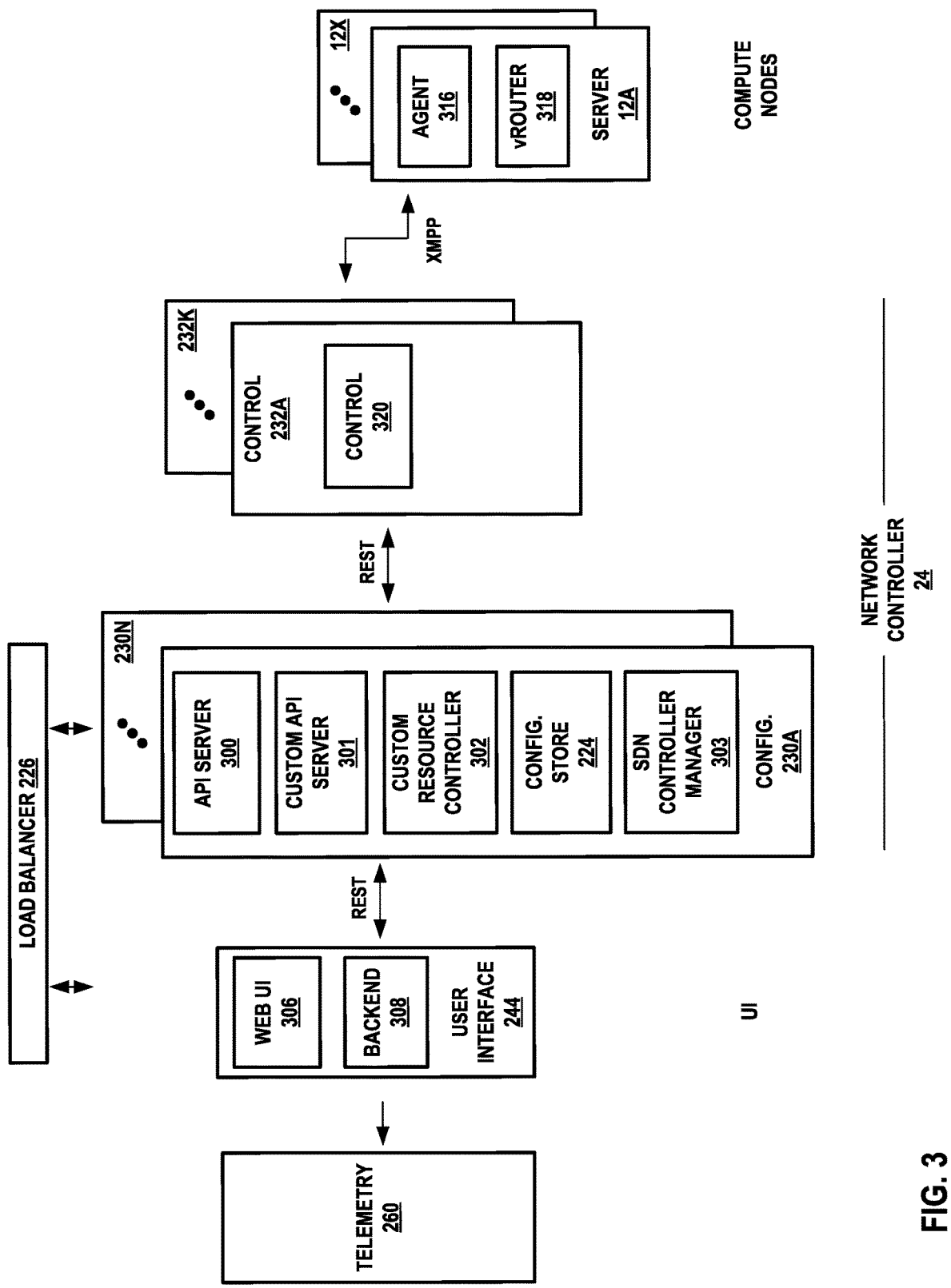
FIG. 3 is a block diagram illustrating another view of components of an SDN architecture system and in further detail, in accordance with techniques of this disclosure.

FIG. 3 is a block diagram illustrating another view of components of SDN architecture 200 and in further detail, in accordance with techniques of this disclosure. Configuration nodes 230, control nodes, 232, and user interface 244 are illustrated with their respective component microservices for implementing network controller 24 and SDN architecture 200 as a cloud-native SDN architecture. Each of the component microservices may be deployed to compute nodes.

FIG. 3 illustrates a single cluster divided into network controller 24, user interface 244, compute (servers 12), and telemetry 260 features. Configuration nodes 230 and control nodes 232 together form network controller 24.

Configuration nodes 230 may include component microservices API server 300 (or "Kubernetes API server 300"—corresponding controller 406 not shown in FIG. 3), custom API server 301, custom resource controller 302, and SDN controller manager 303 (sometimes termed "kube-manager" or "SDN kube-manager" where the orchestration platform for network controller 24 is Kubernetes). Contrail-kube-manager is an example of SDN controller manager 303. Configuration nodes 230 extend the API server 300 interface with a custom API server 301 to form an aggregation layer to support a data model for SDN architecture 200. SDN architecture 200 configuration intents may be custom resources, as described above.

Control nodes 232 may include component microservice control 320. Control 320 performs configuration distribution and route learning and distribution, as described above with respect to FIG. 2.

Compute nodes are represented by servers 12. Each compute node includes a virtual router agent 316 and virtual router forwarding component (vRouter) 318. Either or both of virtual router agent 316 and vRouter 318 may be component microservices. In general, virtual router agent 316 performs control related functions. Virtual router agent 316 receives configuration data from control nodes 232 and converts the configuration data to forwarding information for vRouter 318. Virtual router agent 316 may also performs firewall rule processing, set up flows for vRouter 318, and interface with orchestration plugins (CNI for Kubernetes and Nova plugin for Openstack). Virtual router agent 316 generates routes as workloads (Pods or VMs) are brought up on the compute node, and virtual router agent 316 exchanges such routes with control nodes 232 for distribution to other compute nodes (control nodes 232 distribute the routes among control nodes 232 using BGP). Virtual router agent 316 also withdraws routes as workloads are terminated. vRouter 318 may support one or more forwarding modes, such as kernel mode, DPDK, SmartNIC offload, and so forth. In some examples of container architectures or virtual machine workloads, compute nodes may be either Kubernetes worker/minion nodes or Openstack nova-compute nodes, depending on the particular orchestrator in use.

One or more optional telemetry node(s) 260 provide metrics, alarms, logging, and flow analysis. SDN architecture 200 telemetry leverages cloud native monitoring services, such as Prometheus, Elastic, Fluentd, Kinaba stack (EFK) and Influx TSDB. The SDN architecture component microservices of configuration nodes 230, control nodes 232, compute nodes, user interface 244, and analytics nodes (not shown) may produce telemetry data. This telemetry data may be consumed by services of telemetry node(s) 260. Telemetry node(s) 260 may expose REST endpoints for users and may support insights and event correlation.

Optional user interface 244 includes web user interface (UI) 306 and UI backend 308 services. In general, user interface 244 provides configuration, monitoring, visualization, security, and troubleshooting for the SDN architecture components.

Each of telemetry 260, user interface 244, configuration nodes 230, control nodes 232, and servers 12/compute nodes may be considered SDN architecture 200 nodes, in that each of these nodes is an entity to implement functionality of the configuration, control, or data planes, or of the UI and telemetry nodes. Node scale is configured during "bring up," and SDN architecture 200 supports automatic scaling of SDN architecture 200 nodes using orchestration system operators, such as Kubernetes operators.

Figure 4:
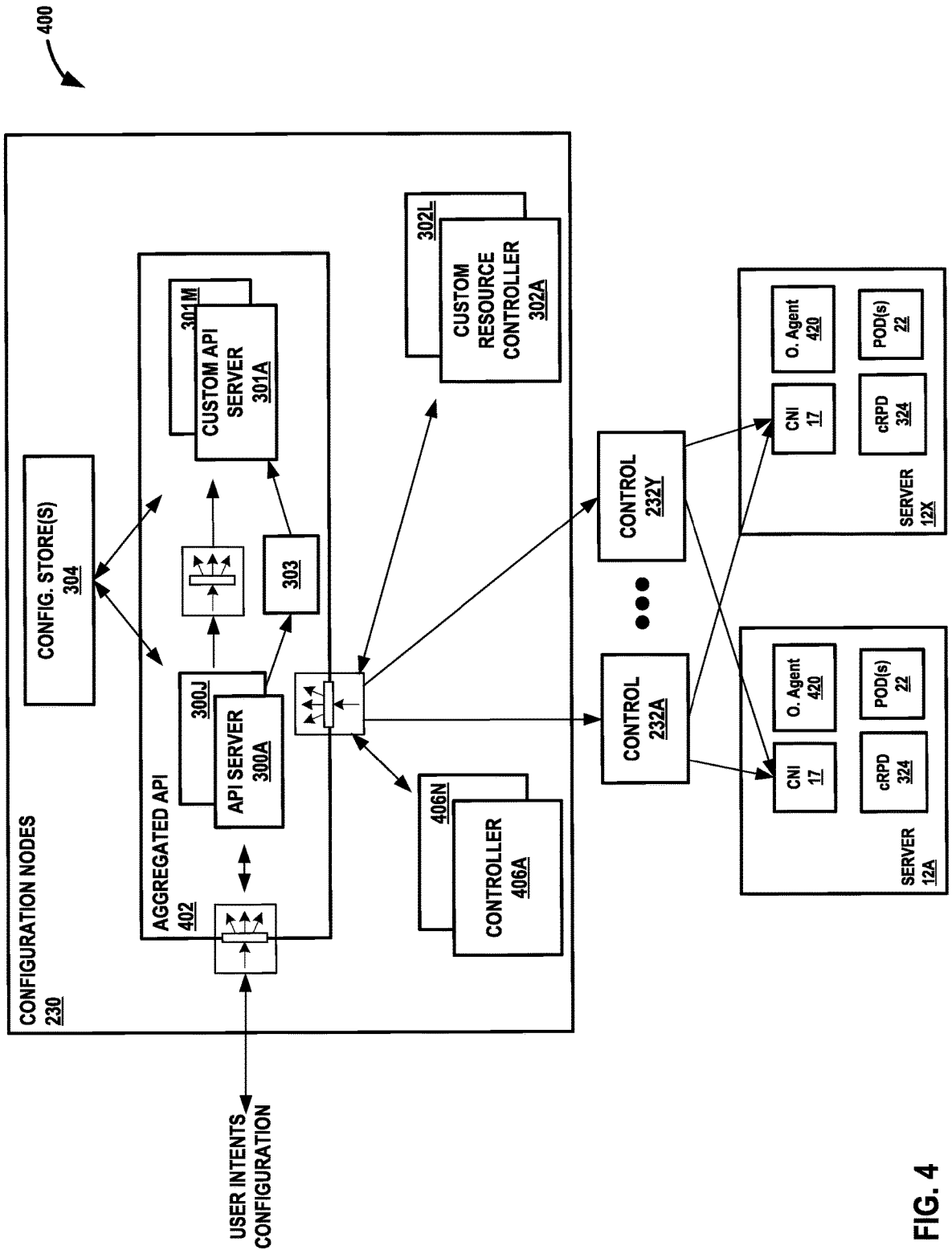
FIG. 4 is a block diagram illustrating example components of an SDN architecture system, in accordance with techniques of this disclosure.

FIG. 4 is a block diagram illustrating example components of an SDN architecture, in accordance with techniques of this disclosure. In this example, SDN architecture 400 extends and uses Kubernetes API server for network configuration objects that realize user intents for the network configuration. Such configuration objects, in Kubernetes terminology, are referred to as custom resources and when persisted in SDN architecture are referred to simply as objects. Configuration objects are mainly user intents (e.g., Virtual Networks, BGPaaS, Network Policy, Service Chaining, etc.).

SDN architecture 400 configuration nodes 230 may uses Kubernetes API server for configuration objects. In Kubernetes terminology, these are called custom resources.

Kubernetes provides two ways to add custom resources to a cluster:
  Custom Resource Definitions (CRDs) are simple and can be created without any programming.
  API Aggregation requires programming but allows more control over API behaviors, such as how data is stored and conversion between API versions.
  Aggregated APIs are subordinate API servers that sit behind the primary API server, which acts as a proxy. This arrangement is called API Aggregation (AA). To users, it simply appears that the Kubernetes API is extended. CRDs allow users to create new types of resources without adding another API server. Regardless of how they are installed, the new resources are referred to as Custom Resources (CR) to distinguish them from native Kubernetes resources (e.g., Pods). CRDs were used in the initial Config prototypes. The architecture may use the API Server Builder Alpha library to implement an aggregated API. API Server Builder is a collection of libraries and tools to build native Kubernetes aggregation extensions.

Usually, each resource in the Kubernetes API requires code that handles REST requests and manages persistent storage of objects. The main Kubernetes API server 300 (implemented with API server microservices 300A-300J) handles native resources and can also generically handle custom resources through CRDs. Aggregated API 402 represents an aggregation layer that extends the Kubernetes API server 300 to allow for specialized implementations for custom resources by writing and deploying custom API server 301 (using custom API server microservices 301A-301M). The main API server 300 delegates requests for the custom resources to custom API server 301, thereby making such resources available to all of its clients.

In this way, API server 300 (e.g., kube-apiserver) may receive the Kubernetes configuration objects, native objects (pods, services) and custom resources. Custom resources for SDN architecture 400 may include configuration objects that, when an intended state of the configuration object in SDN architecture 400 is realized, implements an intended network configuration of SDN architecture 400. Custom resources may correspond to configuration schemas traditionally defined for network configuration but that, according to techniques of this disclosure, are extended to be manipulable through aggregated API 402. Such custom resources may be alternately termed and referred to herein as "custom resources for SDN architecture configuration." Each of the custom resources for SDN architecture configuration may correspond to a type of configuration object conventionally exposed by an SDN controller, but in accordance with techniques described herein, the configuration objects are exposed using custom resources and consolidated along with Kubernetes native/built-in resources. These configuration objects may include virtual network, bgp-as-a-service (BGPaaS), subnet, virtual router, service instance, project, physical interface, logical interface, node, network ipam, floating ip, alarm, alias ip, access control list, firewall policy, firewall rule, network policy, route target, routing instance, etc. Consequently, SDN architecture system 400 supports a unified intent model, exposed by aggregated API 402, that is realized by Kubernetes controllers 406A-406N and by custom resource controllers 302 (shown in FIG. 4 as component microservices 302A-302L) that work to reconcile the actual state of the computing infrastructure including network elements with the intended state.

API server 300 aggregation layer sends API custom resources to their corresponding, registered custom API server 300. There may be multiple custom API servers/custom resource controllers to support different kinds of custom resources. Custom API server 300 handles custom resources for SDN architecture configuration and writes to configuration store(s) 304, which may be etcd. Custom API server 300 may be host and expose an SDN controller identifier allocation service that may be required by custom resource controller 302.

Figure 8:
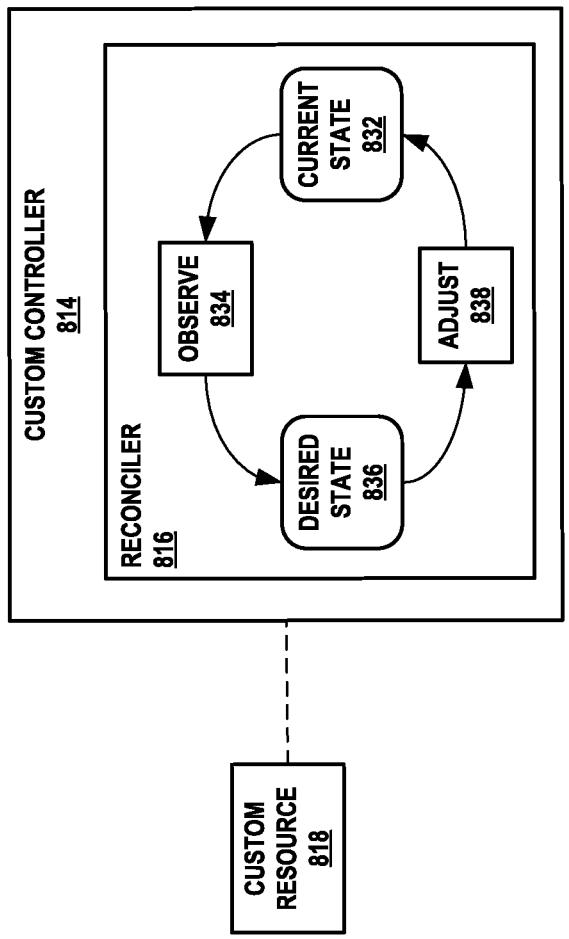
FIG. 8 is a block diagram illustrating an example of a custom controller for custom resource(s) for SDN architecture system configuration, according to techniques of this disclosure.

Custom resource controller(s) 302 start to apply business logic to reach the user's intention provided with user intents configuration. The business logic is implemented as a reconciliation loop. FIG. 8 is a block diagram illustrating an example of a custom controller for custom resource(s) for SDN architecture configuration, according to techniques of this disclosure. Custom controller 814 may represent an example instance of custom resource controller(s) 302. In the example illustrated in FIG. 8, custom controller 814 can be associated with custom resource 818. Custom resource 818 can be any custom resource for SDN architecture configuration. Custom controller 814 can include reconciler 816 that includes logic to execute a reconciliation loop in which custom controller 814 observes 834 (e.g., monitors) a current state 832 of custom resource 818. In response to determining that a desired state 836 does not match a current state 832, reconciler 816 can perform actions to adjust 838 the state of the custom resource such that the current state 832 matches the desired state 836. A request may be received by API server 300 and relayed to custom API server 301 to change the current state 832 of custom resource 818 to desired state 836.

In the case that the request is a create request for a custom resource, reconciler 816 can act on the create event for the instance data for the custom resource. Reconciler 816 may create instance data for custom resources that the requested custom resource depends on. As an example, an edge node custom resource may depend on a virtual network custom resource, a virtual interface custom resource, and an IP address custom resource. In this example, when reconciler 816 receives a create event on an edge node custom resource, reconciler 816 can also create the custom resources that the edge node custom resource depends upon, e.g., a virtual network custom resource, a virtual interface custom resource, and an IP address custom resource.

By default, custom resource controllers 302 are running an active-passive mode and consistency is achieved using master election. When a controller pod starts it tries to create a ConfigMap resource in Kubernetes using a specified key. If creation succeeds, that pod becomes master and starts processing reconciliation requests; otherwise it blocks trying to create ConfigMap in an endless loop.

Figure 9:
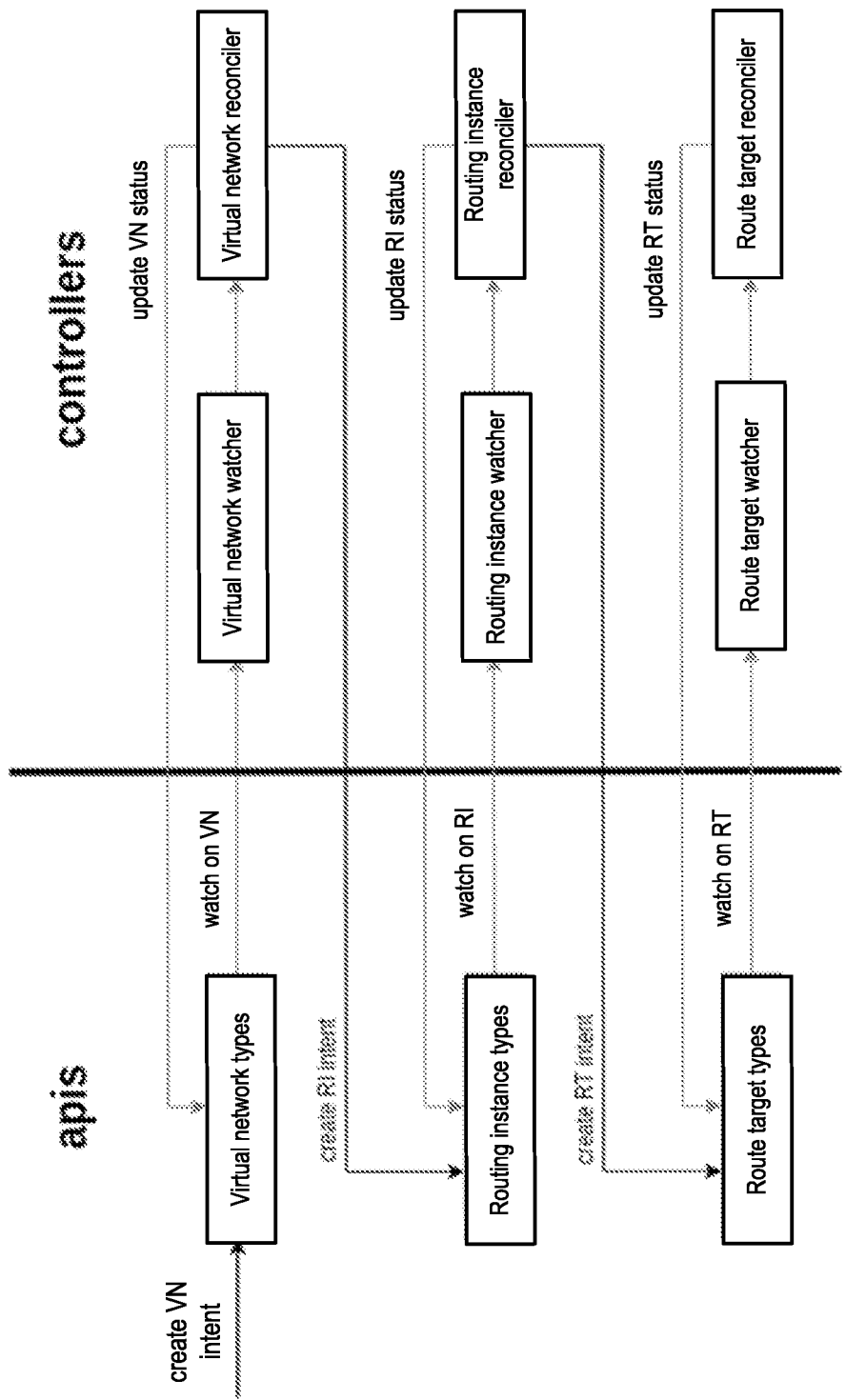
FIG. 9 is a block diagram illustrating an example flow of creation, watch, and reconciliation among custom resource types that have dependencies on different custom resource types.

Custom resource controller 302 may track the status of custom resources it creates. For example, a Virtual Network (VN) creates a Routing Instance (RI) which creates a Route Target (RT). If the creation of a route target fails, the routing instance status is degraded, and because of this the virtual network status is also degraded. Custom resource controller 302 may therefore output a custom message indicating the status(es) of these custom resources, for troubleshooting. An example flow of creation, watch, and reconciliation among custom resource types that have dependencies on different custom resource types is illustrated in FIG. 9.

The configuration plane as implemented by configuration nodes 230 have high availability. Configuration nodes 230 may be based on Kubernetes, including the kube-apiserver service (e.g., API server 300) and the storage backend etcd (e.g., configuration store(s) 304). Effectively, aggregated API 402 implemented by configuration nodes 230 operates as the front end for the control plane implemented by control nodes 232. The main implementation of API server 300 is kube-apiserver, which is designed to scale horizontally by deploying more instances. As shown, several instances of API server 300 can be run to load balance API requests and processing.

Configuration store(s) 304 may be implemented as etcd. Etcd is a consistent and highly-available key value store used as the Kubernetes backing store for cluster data.

In the example of FIG. 4, servers 12 of SDN architecture 400 each include an orchestration agent 420 and a containerized (or "cloud-native") routing protocol daemon 324. These components of SDN architecture 400 are described in further detail below.

SDN controller manager 303 may operate as an interface between Kubernetes core resources (Service, Namespace, Pod, Network Policy, Network Attachment Definition) and the extended SDN architecture resources (VirtualNetwork, RoutingInstance etc.). SDN controller manager 303 watches the Kubernetes API for changes on both Kubernetes core and the custom resources for SDN architecture configuration and, as a result, can perform CRUD operations on the relevant resources.

In some examples, SDN controller manager 303 is a collection of one or more Kubernetes custom controllers. In some examples, in single or multi-cluster deployments, SDN controller manager 303 may run on the Kubernetes cluster(s) it manages SDN controller manager 303 listens to the following Kubernetes objects for Create, Delete, and Update events:
Pod
Service
NodePort
Ingress
Endpoint
Namespace
Deployment
Network Policy When these events are generated, SDN controller manager 303 creates appropriate SDN architecture objects, which are in turn defined as custom resources for SDN architecture configuration. In response to detecting an event on an instance of a custom resource, whether instantiated by SDN controller manager 303 and/or through custom API server 301, control node 232 obtains configuration data for the instance for the custom resource and configures a corresponding instance of a configuration object in SDN architecture 400.

For example, SDN controller manager 303 watches for the Pod creation event and, in response, may create the following SDN architecture objects: VirtualMachine (a workload/pod), VirtualMachineInterface (a virtual network interface), and an InstanceIP (IP address). Control nodes 232 may then instantiate the SDN architecture objects, in this case, in a selected compute node.

As an example, based on a watch, control node 232A may detect an event on an instance of first custom resource exposed by customer API server 301A, where the first custom resource is for configuring some aspect of SDN architecture system 400 and corresponds to a type of configuration object of SDN architecture system 400. For instance, the type of configuration object may be a firewall rule corresponding to the first custom resource. In response to the event, control node 232A may obtain configuration data for the firewall rule instance (e.g., the firewall rule specification) and provision the firewall rule in a virtual router for server 12A. Configuration nodes 230 and control nodes 232 may perform similar operations for other custom resource with corresponding types of configuration objects for the SDN architecture, such as virtual network, bgp-as-a-service (BGPaaS), subnet, virtual router, service instance, project, physical interface, logical interface, node, network ipam, floating ip, alarm, alias ip, access control list, firewall policy, firewall rule, network policy, route target, routing instance, etc.

Figure 5:
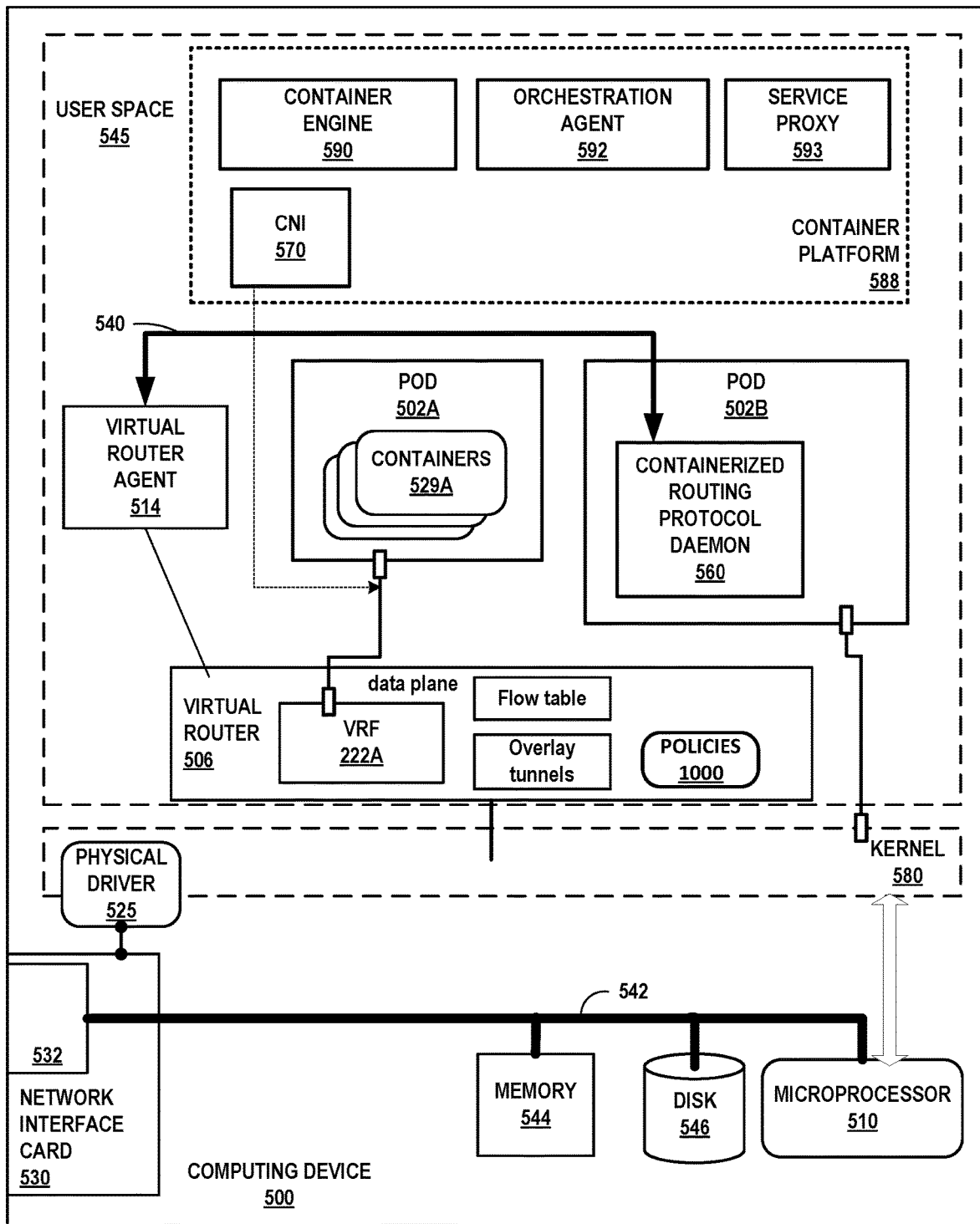
FIG. 5 is a block diagram of an example computing device, according to techniques described in this disclosure.

FIG. 5 is a block diagram of an example computing device, according to techniques described in this disclosure. Computing device 500 of FIG. 2 may represent a real or virtual server and may represent an example instance of any of servers 12 and may be referred to as a compute node, master/minion node, or host. Computing device 500 includes in this example, a bus 542 coupling hardware components of a computing device 500 hardware environment. Bus 542 couples network interface card (NIC) 530, storage disk 546, and one or more microprocessors 210 (hereinafter, "microprocessor 510"). NIC 530 may be SR-IOV-capable. A front-side bus may in some cases couple microprocessor 510 and memory device 524. In some examples, bus 542 may couple memory device 524, microprocessor 510, and NIC 530. Bus 542 may represent a Peripheral Component Interface (PCI) express (PCIe) bus. In some examples, a direct memory access (DMA) controller may control DMA transfers among components coupled to bus 542. In some examples, components coupled to bus 542 control DMA transfers among components coupled to bus 542.

Microprocessor 510 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 546 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 510.

Main memory 524 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 524 provides a physical address space composed of addressable memory locations.

Network interface card (NIC) 530 includes one or more interfaces 532 configured to exchange packets using links of an underlying physical network. Interfaces 532 may include a port interface card having one or more network ports. NIC 530 may also include an on-card memory to, e.g., store packet data. Direct memory access transfers between the NIC 530 and other devices coupled to bus 542 may read/write from/to the NIC memory.

Memory 524, NIC 530, storage disk 546, and microprocessor 510 may provide an operating environment for a software stack that includes an operating system kernel 580 executing in kernel space. Kernel 580 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by the hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 580 provides an execution environment for one or more processes in user space 545.

Kernel 580 includes a physical driver 525 to use the network interface card 530. Network interface card 530 may also implement SR-IOV to enable sharing the physical network function (I/O) among one or more virtual execution elements, such as containers 529A or one or more virtual machines (not shown in FIG. 5). Shared virtual devices such as virtual functions may provide dedicated resources such that each of the virtual execution elements may access dedicated resources of NIC 530, which therefore appears to each of the virtual execution elements as a dedicated NIC. Virtual functions may represent lightweight PCIe functions that share physical resources with a physical function used by physical driver 525 and with other virtual functions. For an SR-IOV-capable NIC 530, NIC 530 may have thousands of available virtual functions according to the SR-IOV standard, but for I/O-intensive applications the number of configured virtual functions is typically much smaller.

Computing device 500 may be coupled to a physical network switch fabric that includes an overlay network that extends switch fabric from physical switches to software or "virtual" routers of physical servers coupled to the switch fabric, including virtual router 506. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 500 of FIG. 5, virtual router 506 executes within user space as a DPDK-based virtual router, but virtual router 506 may execute within a hypervisor, a host operating system, a host application, or a virtual machine in various implementations.

Virtual router 506 may replace and subsume the virtual routing/bridging functionality of the Linux bridge/OVS module that is commonly used for Kubernetes deployments of pods 502. Virtual router 506 may perform bridging (e.g., E-VPN) and routing (e.g., L3VPN, IP-VPNs) for virtual networks. Virtual router 506 may perform networking services such as applying security policies, NAT, multicast, mirroring, and load balancing.

Virtual router 506 can be executing as a kernel module or as a user space DPDK process (virtual router 506 is shown here in user space 545). Virtual router agent 514 may also be executing in user space. In the example computing device 500, virtual router 506 executes within user space as a DPDK-based virtual router, but virtual router 506 may execute within a hypervisor, a host operating system, a host application, or a virtual machine in various implementations. Virtual router agent 514 has a connection to network controller 24 using a channel, which is used to download configurations and forwarding information. Virtual router agent 514 programs this forwarding state to the virtual router data (or "forwarding") plane represented by virtual router 506. Virtual router 506 and virtual router agent 514 may be processes. Virtual router 506 and virtual router agent 514 containerized/cloud-native.

Virtual router 506 may replace and subsume the virtual routing/bridging functionality of the Linux bridge/OVS module that is commonly used for Kubernetes deployments of pods 502. Virtual router 506 may perform bridging (e.g., E-VPN) and routing (e.g., L3VPN, IP-VPNs) for virtual networks. Virtual router 506 may perform networking services such as applying security policies, NAT, multicast, mirroring, and load balancing.

Virtual router 506 may be multi-threaded and execute on one or more processor cores. Virtual router 506 may include multiple queues. Virtual router 506 may implement a packet processing pipeline. The pipeline can be stitched by the virtual router agent 514 from the simplest to the most complicated manner depending on the operations to be applied to a packet. Virtual router 506 may maintain multiple instances of forwarding bases. Virtual router 506 may access and update tables using RCU (Read Copy Update) locks.

To send packets to other compute nodes or switches, virtual router 506 uses one or more physical interfaces 532. In general, virtual router 506 exchanges overlay packets with workloads, such as VMs or pods 502. Virtual router 506 has multiple virtual network interfaces (e.g., vifs). These interfaces may include the kernel interface, vhost0, for exchanging packets with the host operating system; an interface with virtual router agent 514, pkt0, to obtain forwarding state from the network controller and to send up exception packets. There may be one or more virtual network interfaces corresponding to the one or more physical network interfaces 532. Other virtual network interfaces of virtual router 506 are for exchanging packets with the workloads.

In a kernel-based deployment of virtual router 506 (not shown), virtual router 506 is installed as a kernel module inside the operating system. Virtual router 506 registers itself with the TCP/IP stack to receive packets from any of the desired operating system interfaces that it wants to. The interfaces can be bond, physical, tap (for VMs), veth (for containers) etc. Virtual router 506 in this mode relies on the operating system to send and receive packets from different interfaces. For example, the operating system may expose a tap interface backed by a vhost-net driver to communicate with VMs. Once virtual router 506 registers for packets from this tap interface, the TCP/IP stack sends all the packets to it. Virtual router 506 sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 506 (shown in FIG. 5), virtual router 506 is installed as a user space 545 application that is linked to the DPDK library. This may lead to faster performance than a kernel-based deployment, particularly in the presence of high packet rates. The physical interfaces 532 are used by the poll mode drivers (PMDs) of DPDK rather the kernel's interrupt-based drivers. The registers of physical interfaces 532 may be exposed into user space 545 in order to be accessible to the PMDs; a physical interface 532 bound in this way is no longer managed by or visible to the host operating system, and the DPDK-based virtual router 506 manages the physical interface 532. This includes packet polling, packet processing, and packet forwarding. In other words, user packet processing steps are performed by the virtual router 506 DPDK data plane. The nature of this "polling mode" makes the virtual router 506 DPDK data plane packet processing/forwarding much more efficient as compared to the interrupt mode when the packet rate is high. There are comparatively few interrupts and context switching during packet I/O, compared to kernel-mode virtual router 506, and interrupt and context switching during packet I/O may in some cases be avoided altogether.

In general, each of pods 502A-502B may be assigned one or more virtual network addresses for use within respective virtual networks, where each of the virtual networks may be associated with a different virtual subnet provided by virtual router 506. Pod 502B may be assigned its own virtual layer three (L3) IP address, for example, for sending and receiving communications but may be unaware of an IP address of the computing device 500 on which the pod 502B executes. The virtual network address may thus differ from the logical address for the underlying, physical computer system, e.g., computing device 500.

Computing device 500 includes a virtual router agent 514 that controls the overlay of virtual networks for computing device 500 and that coordinates the routing of data packets within computing device 500. In general, virtual router agent 514 communicates with network controller 24 for the virtualization infrastructure, which generates commands to create virtual networks and configure network virtualization endpoints, such as computing device 500 and, more specifically, virtual router 506, as a well as virtual network interface 212. By configuring virtual router 506 based on information received from network controller 24, virtual router agent 514 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 529A-529B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 506. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 506 performs tunnel encapsulation/decapsulation for packets sourced by/destined to any containers of pods 502, and virtual router 506 exchanges packets with pods 502 via bus 542 and/or a bridge of NIC 530.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 506 implements one or more virtual routing and forwarding instances (VRFs), such as VRF 222A, for respective virtual networks for which virtual router 506 operates as respective tunnel endpoints. In general, each of the VRFs stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of the VRFs may include a network forwarding table storing routing and forwarding information for the virtual network.

NIC 530 may receive tunnel packets. Virtual router 506 processes the tunnel packet to determine, from the tunnel encapsulation header, the virtual network of the source and destination endpoints for the inner packet. Virtual router 506 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212. VRF 222A forwards the inner packet via virtual network interface 212 to pod 502A in response.

Containers 529A may also source inner packets as source virtual network endpoints. Container 529A, for instance, may generate a layer 3 inner packet destined for a destination virtual network endpoint that is executed by another computing device (i.e., not computing device 500) or for another one of containers. Container 529A may sends the layer 3 inner packet to virtual router 506 via the virtual network interface attached to VRF 222A.

Virtual router 506 receives the inner packet and layer 2 header and determines a virtual network for the inner packet. Virtual router 506 may determine the virtual network using any of the above-described virtual network interface implementation techniques (e.g., macvlan, veth, etc.). Virtual router 506 uses the VRF 222A corresponding to the virtual network for the inner packet to generate an outer header for the inner packet, the outer header including an outer IP header for the overlay tunnel and a tunnel encapsulation header identifying the virtual network. Virtual router 506 encapsulates the inner packet with the outer header. Virtual router 506 may encapsulate the tunnel packet with a new layer 2 header having a destination layer 2 address associated with a device external to the computing device 500, e.g., a TOR switch 16 or one of servers 12. If external to computing device 500, virtual router 506 outputs the tunnel packet with the new layer 2 header to NIC 530 using physical function 221. NIC 530 outputs the packet on an outbound interface. If the destination is another virtual network endpoint executing on computing device 500, virtual router 506 routes the packet to the appropriate one of virtual network interfaces 212, 213.

In some examples, a controller for computing device 500 (e.g., network controller 24 of FIG. 1) configures a default route in each of pods 502 to cause the pods to use virtual router 506 as an initial next hop for outbound packets. In some examples, NIC 530 is configured with one or more forwarding rules to cause all packets received from the pods to be switched to virtual router 506.

Pod 502A includes one or more application containers 529A. Pod 502B includes an instance of containerized routing protocol daemon (CRPD) 560. Container platform 588 includes container runtime 590, orchestration agent 592, service proxy 593, and CNI 570.

Container engine 590 includes code executable by microprocessor 510. Container runtime 590 may be one or more computer processes. Container engine 590 runs containerized applications in the form of containers 529A-529B. Container engine 590 may represent a Docker, rkt, or other container engine for managing containers. In general, container engine 590 receives requests and manages objects such as images, containers, networks, and volumes. An image is a template with instructions for creating a container. A container is an executable instance of an image. Based on directives from orchestration agent 592, container engine 590 may obtain images and instantiate them as executable containers in pods 502A-502B.

Service proxy 593 includes code executable by microprocessor 510. Service proxy 593 may be one or more computer processes. Service proxy 593 monitors for the addition and removal of service and endpoints objects, and it maintains the network configuration of the computing device 500 to ensure communication among pods and containers, e.g., using services. Service proxy 593 may also manage iptables to capture traffic to a service's virtual IP address and port and redirect the traffic to the proxy port that proxies a backed pod. Service proxy 593 may represent a kube-proxy for a minion node of a Kubernetes cluster. In some examples, container platform 588 does not include a service proxy 593 or the service proxy 593 is disabled in favor of configuration of virtual router 506 and pods 502 by CNI 570.

Orchestration agent 592 includes code executable by microprocessor 510. Orchestration agent 592 may be one or more computer processes. Orchestration agent 592 may represent a kubelet for a minion node of a Kubernetes cluster. Orchestration agent 592 is an agent of an orchestrator, e.g., orchestrator 23 of FIG. 1, that receives container specification data for containers and ensures the containers execute by computing device 500. Container specification data may be in the form of a manifest file sent to orchestration agent 592 from orchestrator 23 or indirectly received via a command line interface, HTTP endpoint, or HTTP server. Container specification data may be a pod specification (e.g., a PodSpec-a YAML (Yet Another Markup Language) or JSON object that describes a pod) for one of pods 502 of containers. Based on the container specification data, orchestration agent 592 directs container engine 590 to obtain and instantiate the container images for containers 529, for execution of containers 529 by computing device 500.

Orchestration agent 592 instantiates or otherwise invokes CNI 570 to configure one or more virtual network interfaces for each of pods 502. For example, orchestration agent 592 receives a container specification data for pod 502A and directs container engine 590 to create the pod 502A with containers 529A based on the container specification data for pod 502A. Orchestration agent 592 also invokes the CNI 570 to configure, for pod 502A, virtual network interface for a virtual network corresponding to VRFs 222A. In this example, pod 502A is a virtual network endpoint for a virtual network corresponding to VRF 222A.

CNI 570 may obtain interface configuration data for configuring virtual network interfaces for pods 502. Virtual router agent 514 operates as a virtual network control plane module for enabling network controller 24 to configure virtual router 506. Unlike the orchestration control plane (including the container platforms 588 for minion nodes and the master node(s), e.g., orchestrator 23), which manages the provisioning, scheduling, and managing virtual execution elements, a virtual network control plane (including network controller 24 and virtual router agent 514 for minion nodes) manages the configuration of virtual networks implemented in the data plane in part by virtual routers 506 of the minion nodes. Virtual router agent 514 communicates, to CNI 570, interface configuration data for virtual network interfaces to enable an orchestration control plane element (i.e., CNI 570) to configure the virtual network interfaces according to the configuration state determined by the network controller 24, thus bridging the gap between the orchestration control plane and virtual network control plane. In addition, this may enable a CNI 570 to obtain interface configuration data for multiple virtual network interfaces for a pod and configure the multiple virtual network interfaces, which may reduce communication and resource overhead inherent with invoking a separate CNI 570 for configuring each virtual network interface.

Containerized routing protocol daemons are described in U.S. application Ser. No. 17/649,632, filed Feb. 1, 2022, which is incorporated by reference herein in its entirety.

Virtual router 506 implements policies 1000, which are configured by control nodes 32 based on network policies received by configuration nodes 30. Policies 1000 may include one or more application firewall policy rules, and each of the one or more application firewall policy rules defines whether one of virtual routers 21 should allow or deny a packet flow for a respective workload. For example, policy controller 54 may use a 5-tuple of a session record for a workload to define a 5-tuple for an application firewall policy rule. Furthermore, policy controller 54 may define, based on the session record, a rule for the firewall policy rule (e.g., allow, block, log, or report traffic that corresponds to the rule). In some examples, each firewall policy rule specifies a default rule to allow corresponding network traffic, and all other network traffic that does not match a generated firewall policy rule is blocked.

In an example, policy controller 54 uses SDN architecture configuration objects to implement network policies 1010. As one example, policy controller 54 applies a first set of configuration objects at a global level. The first set configuration objects includes global application policy sets, global firewall policies, global firewall rules, and global tags across a plurality of levels and/or categories. Policy controller 54 distributes, for example to the virtual routers, the first set of configuration objects at the global level. Policy controller 54 matches global tags associated with global application policy sets, global firewall policies, and global firewall rules to objects tagged with the global tags. Based on the global application policy sets, global firewall policies, and global firewall rules, policy controller 54 allow or block network traffic between virtual network interfaces of the objects tagged with the global tags. The interfaces may be virtual machine interfaces (VMIs), for instance.

Furthermore, in such examples, policy controller 54 applies a second set of configuration objects at a project level. The second set of policy rules may include project-specific application policy sets, firewall policies, firewall rules, and tags across a plurality of levels. Policy controller 54 distributes the second set of configuration objects at the project level. Policy controller 54 matches project tags associated with project-specific application policy sets, firewall policies, and firewall rules to objects tagged with the project tags. Based on the project-specific application policy sets, firewall policies, and firewall rules, policy controller 54 allows or blocks network traffic between interfaces of the objects tagged with the project tags.

In further examples, policy controller 54 may specify lower-level configuration objects, such as application policy sets, firewall policies, firewall rules, and tags defined at a virtual network-specific level, a virtual machine-specific level, and/or an interface-specific level. By doing so, policy controller 54 may apply a hierarchical set of policies to a plurality of objects within one or more data centers 10. Thus, the techniques of the disclosure allow for distribution of simplified traffic policies that are scalable and robust across many different types of deployments and execution environments. Additional description is found in U.S. patent application Ser. No. 15/819,522, filed Nov. 22, 2017 and entitled "Scalable Policy Management for Virtual Networks" and in U.S. Publication No. US 2020/0106744, published Apr. 2, 2020 and entitled "Intent-based Policy Generation for Virtual Networks," each of which is incorporated by reference in its entirety.

In some examples, network policies 1000 of FIG. 1 may be Kubernetes network policies. An example Kubernetes network policy "test-network-policy" is:

```
apiVersion: networking.k8s.io/v1
kind: NetworkPolicy
metadata:
        name: test-network-policy
        namespace: default
spec:
        podSelector:
                matchLabels:
                        role: db
        policyTypes:
        - Ingress
        - Egress
        ingress:
        - from:
                - ipBlock:
                        cidr: 17x.xx.0.0/16
                        except:
                        - 17x.xx.1.0/24
                - namespaceSelector:
                        matchLabels:
                                project: myproject
                - podSelector:
                        matchLabels:
                                role: frontend
          ports:
          - protocol: TCP
                port: 6379
        egress:
        - to:
                - ipBlock:
                        cidr: 10.0.0.0/24
          ports:
          - protocol: TCP
                port: 5978
```

As described above, SDN controller manager 303 binds the orchestrator and SDN architecture together. As an aspect of such binding, SDN controller manager 303 listens for updates to network policies 1010 as native resources of the orchestration platform and converts these network policy events into SDN architecture configuration objects. This may include SDN controller manager 303 invoking custom API server 301 to create custom resources, in the form of firewall policies, corresponding to the network policies.

In an example set of operations to perform this conversion for a network policy, SDN controller manager 303 may create a tag for each Kubernetes label, create address groups, create a firewall policy for each Kubernetes network policy, and create an Application Policy Set (APS) to represent the cluster (all firewall policies created in that cluster are attached to this application policy set. Modifications to existing Kubernetes network policies result in the corresponding firewall policies being updated by SDN controller manager 303. The tag, firewall policy, and APS are all custom resources according to techniques of this disclosure.

For the above example Kubernetes network policy "test-network-policy", SDN controller manager 303 may create the following tags if they do not already exist: {role: db, namespace: default}, the following address groups if they do not already exist (name:prefix): {17x.xx. 1.0/24:17x.xx.1.0/24, 17x.xx.0.0/16:17x.xx.0.0/16, 10.0.0.0/24:10.0.0.0/24}, and the following firewall rules if they do not already exist (Rule name, action, services, endpoint1, direction, endpoint2) {default-ingress-test-network-policy-0-ipBlock-0-17x.xx.1.0/24-0, deny, tcp:6379, Address Group:17x.xx.1.0/24, >, role-db && namespace=default;; default-ingress-test-network-policy-0-ipBlock-0-cidr-17x.xx.0.0/16-0, pass, tcp: 6379, Address Group: 17x.xx.0.0/16, >, role-db && namespace=default;; default-ingress-test-network-policy-0-namespaceSelector-1-0, pass, tcp:6379, project=myproject, >, role=db && namespace=default;; default-ingress-test-network-policy-0-podSelector-2-0, pass, tcp:6379, namespace=default && role-frontend, >, role=db && namespace=default;; default-egress-test-network-policy-ipBlock-0-cidr-10.0.0.0/24-0, pass, tcp:5978, role=db && namespace=default, >, Address 10.0.0.0/24}. The designator 'pass' means allow. Endpoints in this context are endpoint workloads that match the criteria listed for an endpoint. e.g., addresses within a prefix range or workloads tagged with the listed tags. By contrast, a Kubernetes Endpoint is a resource for a pod's IP address and port.

SDN controller manager 303 may create a firewall security policy that includes the above rules, again using custom API server 301. Control nodes 232 may obtain the firewall rules and program these into virtual routers via virtual router agents, which implement the firewall policy rules as policies 1000. Policies 1000 are enforced by the various virtual routers 21 in system 200 (of which virtual router 506 is an example), and policies 1000 in this way are used to implement network policies 1010.

As a result of the above techniques, policy controller 54, validation system 60, flow records 56, and network controller 24 provide automated policy validation to facilitate continuous deployment and continuous integration with respect to the configuration of an SDN architecture to support distributed applications.

Figure 6:
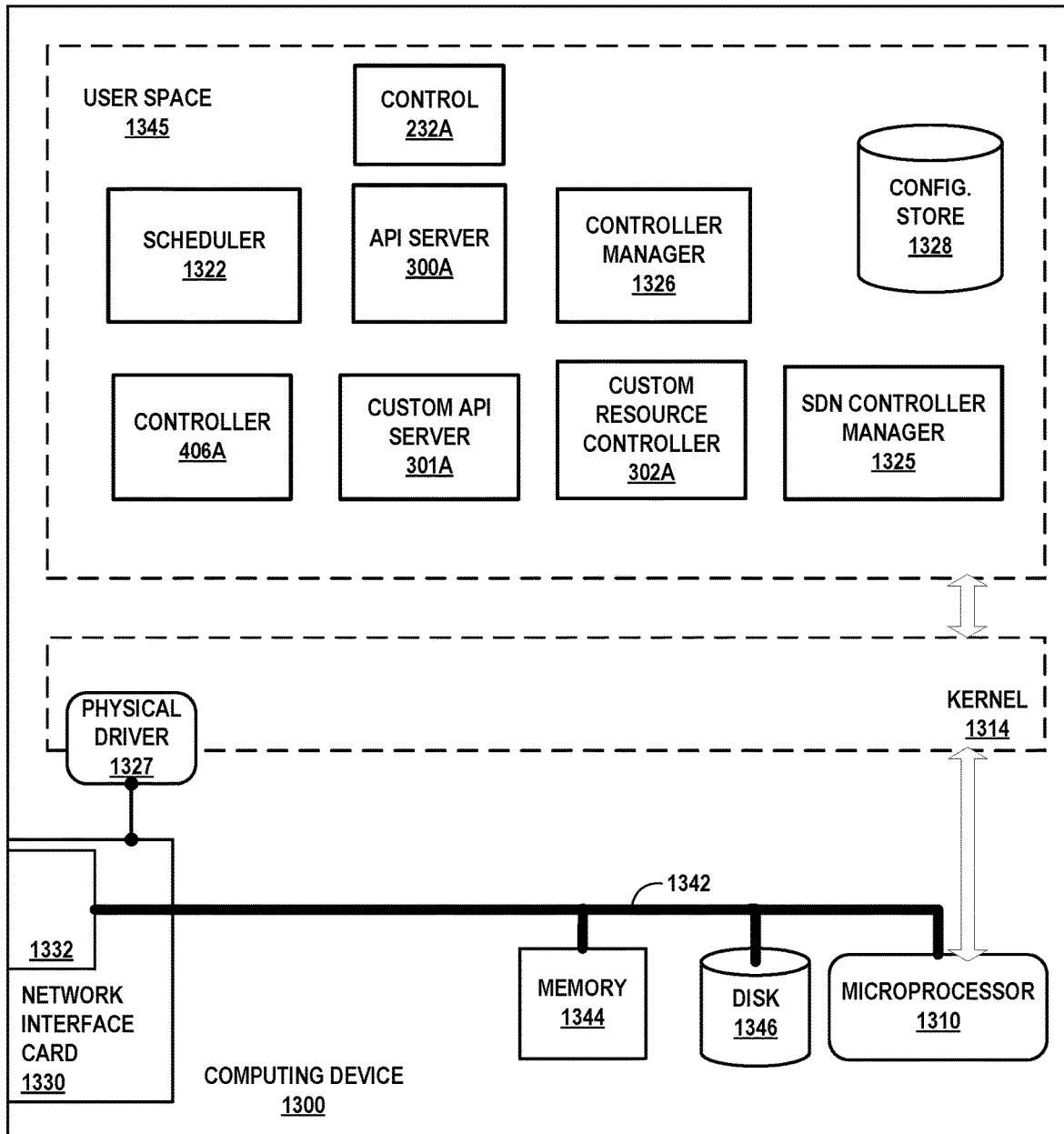
FIG. 6 is a block diagram of an example computing device operating as a compute node for one or more clusters for an SDN architecture system, in accordance with techniques of this disclosure.

FIG. 6 is a block diagram of an example computing device operating as a compute node for one or more clusters for an SDN architecture system, in accordance with techniques of this disclosure. Computing device 1300 may represent one or more real or virtual servers. Computing device 1300 may in some instances implement one or more master nodes for respective clusters, or for multiple clusters.

Scheduler 1322, API server 300A, controller 406A, custom API server 301A, custom resource controller 302A, controller manager 1326, SDN controller manager 1325, control node 232A, and configuration store 1328, although illustrated and described as being executed by a single computing device 1300, may be distributed among multiple computing devices that make up a computing system or hardware/server cluster. Each of the multiple computing devices, in other words, may provide a hardware operating environment for one or more instances of any one or more of scheduler 1322, API server 300A, controller 406A, custom API server 301A, custom resource controller 302A, controller manager 1326, network controller 1324, SDN controller manager 1325, control node 232A, or configuration store 1328.

Computing device 1300 includes in this example, a bus 1342 coupling hardware components of a computing device 1300 hardware environment. Bus 1342 couples network interface card (NIC) 1330, storage disk 1346, and one or more microprocessors 1310 (hereinafter, "microprocessor 1310"). A front-side bus may in some cases couple microprocessor 1310 and memory device 1344. In some examples, bus 1342 may couple memory device 1344, microprocessor 1310, and NIC 1330. Bus 1342 may represent a Peripheral Component Interface (PCI) express (PCIe) bus. In some examples, a direct memory access (DMA) controller may control DMA transfers among components coupled to bus 1342. In some examples, components coupled to bus 1342 control DMA transfers among components coupled to bus 1342.

Microprocessor 1310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 1346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 1310.

Main memory 1344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 1344 provides a physical address space composed of addressable memory locations.

Network interface card (NIC) 1330 includes one or more interfaces 3132 configured to exchange packets using links of an underlying physical network. Interfaces 3132 may include a port interface card having one or more network ports. NIC 1330 may also include an on-card memory to, e.g., store packet data. Direct memory access transfers between the NIC 1330 and other devices coupled to bus 1342 may read/write from/to the NIC memory.

Memory 1344, NIC 1330, storage disk 1346, and microprocessor 1310 may provide an operating environment for a software stack that includes an operating system kernel 1314 executing in kernel space. Kernel 1314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 1314 provides an execution environment for one or more processes in user space 1345. Kernel 1314 includes a physical driver 1327 to use the network interface card 530.

Computing device 1300 may be coupled to a physical network switch fabric that includes an overlay network that extends switch fabric from physical switches to software or virtual routers of physical servers coupled to the switch fabric, such virtual routers 21. Computing device 1300 may use one or more dedicated virtual networks to configure minion nodes of a cluster.

API server 300A, scheduler 1322, controller 406A, custom API server 301A, custom resource controller 302A, controller manager 1326, and configuration store 1328 may implement a master node for a cluster and be alternatively referred to as "master components." The cluster may be a Kubernetes cluster and the master node a Kubernetes master node, in which case the master components are Kubernetes master components.

Each of API server 300A, controller 406A, custom API server 301A, and custom resource controller 302A includes code executable by microprocessor 1310. Custom API server 301A validates and configures data for custom resources for SDN architecture configuration. A service may be an abstraction that defines a logical set of pods and the policy used to access the pods. The set of pods implementing a service are selected based on the service definition. A service may be implemented in part as, or otherwise include, a load balancer. API server 300A and custom API server 301A may implement a Representational State Transfer (REST) interface to process REST operations and provide the frontend, as part of the configuration plane for an SDN architecture, to a corresponding cluster's shared state stored to configuration store 1328. API server 300A may represent a Kubernetes API server.

Configuration store 1328 is a backing store for all cluster data. Cluster data may include cluster state and configuration data. Configuration data may also provide a backend for service discovery and/or provide a locking service. Configuration store 1328 may be implemented as a key value store. Configuration store 1328 may be a central database or distributed database. Configuration store 1328 may represent an etcd store. Configuration store 1328 may represent a Kubernetes configuration store.

Scheduler 1322 includes code executable by microprocessor 1310. Scheduler 1322 may be one or more computer processes. Scheduler 1322 monitors for newly created or requested virtual execution elements (e.g., pods of containers) and selects a minion node on which the virtual execution elements are to run. Scheduler 1322 may select a minion node based on resource requirements, hardware constraints, software constraints, policy constraints, locality, etc. Scheduler 1322 may represent a Kubernetes scheduler.

In general, API server 1320 may invoke the scheduler 1322 to schedule a pod. Scheduler 1322 may select a minion node and returns an identifier for the selected minion node to API server 1320, which may write the identifier to the configuration store 1328 in association with the pod. API server 1320 may invoke the orchestration agent 310 for the selected minion node, which may cause the container engine 208 for the selected minion node to obtain the pod from a storage server and create the virtual execution element on the minion node. The orchestration agent 310 for the selected minion node may update the status for the pod to the API server 1320, which persists this new state to the configuration store 1328. In this way, computing device 1300 instantiates new pods in the computing infrastructure 8.

Controller manager 1326 includes code executable by microprocessor 1310. Controller manager 1326 may be one or more computer processes. Controller manager 1326 may embed the core control loops, monitoring a shared state of a cluster by obtaining notifications from API Server 1320. Controller manager 1326 may attempt to move the state of the cluster toward the desired state. Example controller 406A and custom resource controller 302A may be managed by the controller manager 1326. Other controllers may include a replication controller, endpoints controller, namespace controller, and service accounts controller. Controller manager 1326 may perform lifecycle functions such as namespace creation and lifecycle, event garbage collection, terminated pod garbage collection, cascading-deletion garbage collection, node garbage collection, etc. Controller manager 1326 may represent a Kubernetes Controller Manager for a Kubernetes cluster.

A network controller for an SDN architecture described herein may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

The network controller (or "SDN controller") may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances.

SDN controller manager 1325 includes code executable by microprocessor 1310. SDN controller manager 1325 may be one or more computer processes. SDN controller manager 1325 operates as an interface between the orchestration-oriented elements (e.g., scheduler 1322, API server 300A and custom API server 301A, controller manager 1326, and configuration store 1328). In general, SDN controller manager 1325 monitors the cluster for new Kubernetes native objects (e.g., pods and services). SDN controller manager 1325 may isolate pods in virtual networks and connect pods with services.

SDN controller manager 1325 may be executed as a container of the master node for a cluster. In some cases, using SDN controller manager 1325 enables disabling the service proxies of minion nodes (e.g., the Kubernetes kube-proxy) such that all pod connectivity is implemented using virtual routers, as described herein.

Components of the network controller 24 may operate as a CNI for Kubernetes and may support multiple deployment modes. CNI 17, CNI 750 are the compute node interfaces for this overall CNI framework for managing networking for Kubernetes. The deployment modes can be divided into two categories: (1) an SDN architecture cluster as a CNI integrated into a workload Kubernetes cluster, and (2) an SDN architecture cluster as a CNI that is separate from the workload Kubernetes clusters.

Integrated with Workload Kubernetes Cluster

Components of the network controller 24 (e.g., custom API server 301, custom resource controller 302, SDN controller manager 1325, and control nodes 232) are running in the managed Kubernetes cluster on master nodes, close to the Kubernetes controller components. In this mode, components of network controller 24 are effectively part of the same Kubernetes cluster as the workloads.

Separate from Workload Kubernetes Clusters

Components of the network controller 24 will be executed by a separate Kubernetes cluster from the workload Kubernetes clusters.

SDN controller manager 1325 may use a controller framework for the orchestration platform to listen for (or otherwise monitor for) changes in objects that are defined in the Kubernetes native API and to add annotations to some of these objects. The annotations may be labels or other identifiers specifying properties of the objects (e.g., "Virtual Network Green"). SDN controller manager 1325 is a component of the SDN architecture that listens to Kubernetes core resources (such as Pod, NetworkPolicy, Service, etc.) events and converts those to custom resources for SDN architecture configuration as needed. The CNI plugin (e.g., CNIs 17, 570) is an SDN architecture component supporting the Kubernetes networking plugin standard: container network interface.

SDN controller manager 1325 may create a network solution for the application using the REST interface exposed by aggregated API 402 to define network objects such as virtual networks, virtual network interfaces, and access control policies. Network controller 24 components may implement the network solution in the computing infrastructure by, e.g., configuring the one or more virtual network and virtual network interfaces in the virtual routers. (This is merely one example of an SDN configuration.)

The following example deployment configuration for this application consists of a pod and the virtual network information for the pod:

api Version: v1
kind: Pod
metadata:
  name: multi-net-pod
  annotations:
    networks: '[
      {"name": "red-network" },
      {"name": "blue-network" },
      {"name": "default/extns-network" }
    ]'
spec:
  containers:
    image: busybox
    command:
      sleep
      "3600"
    imagePullPolicy: IfNotPresent
    name: busybox
    stdin: true
    tty: true
restartPolicy: Always This metadata information may be copied to each pod replica created by the controller manager 1326. When the SDN controller manager 1325 is notified of these pods, SDN controller manager 1325 may create virtual networks as listed in the annotations ("red-network", "blue-network", and "default/extns-network" in the above example) and create, for each of the virtual networks, a virtual network interface per-pod replica (e.g., pod 202A) with a unique private virtual network address from a cluster-wide address block (e.g. 10.0/16) for the virtual network.

Additional techniques in accordance with this disclosure are described below. Contrail is an example network controller architecture. Contrail CNI may be a CNI developed for Contrail. A cloud-native Contrail controller may be an example of a network controller described in this disclosure, such as network controller 24.

Figure 7:
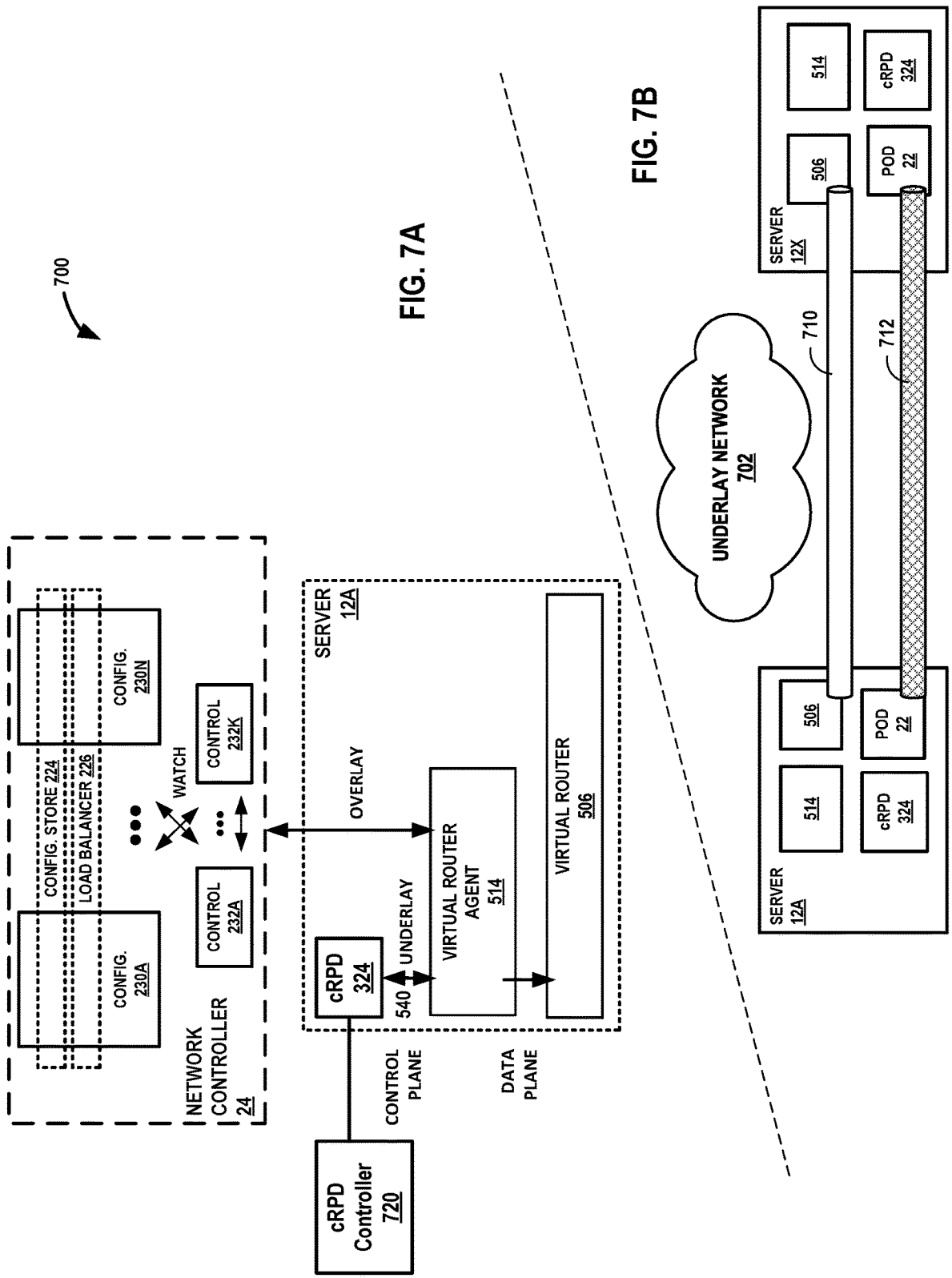
FIG. 7A is a block diagram illustrating control/routing planes for underlay network and overlay network configuration using an SDN architecture system, according to techniques of this disclosure.
FIG. 7B is a block diagram illustrating a configured virtual network to connect pods using a tunnel configured in the underlay network, according to techniques of this disclosure.

FIG. 7A is a block diagram illustrating control/routing planes for underlay network and overlay network configuration using an SDN architecture, according to techniques of this disclosure. FIG. 7B is a block diagram illustrating a configured virtual network to connect pods using a tunnel configured in the underlay network, according to techniques of this disclosure.

Network controller 24 for the SDN architecture may use distributed or centralized routing plane architectures. The SDN architecture may use a containerized routing protocol daemon (process).

From the perspective of network signaling, the routing plane can work according to a distributed model, where a cRPD runs on every compute node in the cluster. This essentially means that the intelligence is built into the compute nodes and involves complex configurations at each node. The route reflector (RR) in this model may not make intelligent routing decisions but is used as a relay to reflect routes between the nodes. A distributed container routing protocol daemon (cRPD) is a routing protocol process that may be used wherein each compute node runs its own instance of the routing daemon. At the same time, a centralized cRPD master instance may act as an RR to relay routing information between the compute nodes. The routing and configuration intelligence is distributed across the nodes with an RR at the central location.

The routing plane can alternatively work according to a more centralized model, in which components of network controller runs centrally and absorbs the intelligence needed to process configuration information, construct the network topology, and program the forwarding plane into the virtual routers. The virtual router agent is a local agent to process information being programmed by the network controller. This design leads to facilitates more limited intelligence required at the compute nodes and tends to lead to simpler configuration states.

The centralized control plane provides for the following:

Allows for the agent routing framework to be simpler and lighter. The complexity and limitations of BGP are hidden from the agent. There is no need for the agent to understand concepts like route-distinguishers, route-targets, etc. The agents just exchange prefixes and build its forwarding information accordingly Control nodes can do more than routing. They build on the virtual network concept and can generate new routes using route replication and re-origination (for instance to support features like service chaining and inter-VN routing, among other use cases).

Building the BUM tree for optimal broadcast and multicast forwarding.

Note that the control plane has a distributed nature for certain aspects. As a control plane supporting distributed functionality, it allows each local virtual router agent to publish its local routes and subscribe for configuration on a need-to-know basis.

It makes sense then to think of the control plane design from a tooling POV and use tools at hand appropriately where they fit best. Consider the set of pros and cons of contrail-bgp and cRPD.

The following functionalities may be provided by CRPDs or control nodes of network controller 24.

Routing Daemon/Process

Both control nodes and cRPDs can act as routing daemons implementing different protocols and having the capability to program routing information in the forwarding plane.

cRPD implements routing protocols with a rich routing stack that includes interior gateway protocols (IGPs) (e.g., intermediate system to intermediate system (IS-IS)), BGP-LU, BGP-CT, SR-MPLS/SRv6, bidirectional forwarding detection (BFD), path computation element protocol (PCEP), etc. It can also be deployed to provide control plane only services such as a route-reflector and is popular in internet routing use-cases due to these capabilities.

Control nodes 232 also implement routing protocols but are predominantly BGP-based. Control nodes 232 understands overlay networking. Control nodes 232 provide a rich feature set in overlay virtualization and cater to SDN use cases. Overlay features such as virtualization (using the abstraction of a virtual network) and service chaining are very popular among telco and cloud providers. cRPD may not in some cases include support for such overlay functionality. However, the rich feature set of CRPD provides strong support for the underlay network.

Network Orchestration/Automation

Routing functionality is just one part of the control nodes 232. An integral part of overlay networking is orchestration Apart from providing overlay routing, control nodes 232 help in modeling the orchestration functionality and provide network automation. Central to orchestration capabilities of control nodes 232 is an ability to use the virtual network (and related objects)-based abstraction to model network virtualization. Control nodes 232 interface with the configuration nodes 230 to relay configuration information to both the control plane and the data plane. Control nodes 232 also assist in building overlay trees for multicast layer 2 and layer 3. For example, a control node may build a virtual topology of the cluster it serves to achieve this. cRPD does not typically include such orchestration capabilities.

High Availability and Horizontal Scalability

Control node design is more centralized while cRPD is more distributed. There is a cRPD worker node running on each compute node. Control nodes 232 on the other hand do not run on the compute and can even run on a remote cluster (i.e., separate and in some cases geographically remote from the workload cluster). Control nodes 232 also provide horizontal scalability for HA and run in active-active mode. The compute load is shared among the control nodes 232. cRPD on the other hand does not typically provide horizontal scalability. Both control nodes 232 and cRPD may provide HA with graceful restart and may allow for data plane operation in headless mode—wherein the virtual router can run even if the control plane restarts.

The control plane should be more than just a routing daemon. It should support overlay routing and network orchestration/automation, while cRPD does well as a routing protocol in managing underlay routing. cRPD, however, typically lacks network orchestration capabilities and does not provide strong support for overlay routing.

Accordingly, in some examples, the SDN architecture may have cRPD on the compute nodes as shown in FIGS. 7A-7B. FIG. 7A illustrates SDN architecture 700, which may represent an example implementation SDN architecture 200 or 400. In SDN architecture 700, cRPD 324 runs on the compute nodes and provide underlay routing to the forwarding plane while running a centralized (and horizontally scalable) set of control nodes 232 providing orchestration and overlay services. In some examples, instead of running cRPD 324 on the compute nodes, a default gateway may be used.

CRPD 324 on the compute nodes provides rich underlay routing to the forwarding plane by interacting with virtual router agent 514 using interface 540, which may be a gRPC interface. The virtual router agent interface may permit programming routes, configuring virtual network interfaces for the overlay, and otherwise configuring virtual router 506. This is described in further detail in U.S. application Ser. No. 17/649,632. At the same time, one or more control nodes 232 run as separate pods providing overlay services. SDN architecture 700 may thus obtain both a rich overlay and orchestration provided by control nodes 232 and modern underlay routing by cRPD 324 on the compute nodes to complement control nodes 232. A separate cRPD controller 720 may be used to configure the cRPDs 324. cRPD controller 720 may be a device/element management system, network management system, orchestrator, a user interface/CLI, or other controller. cRPDs 324 run routing protocols and exchange routing protocol messages with routers, including other cRPDs 324. Each of cRPDs 324 may be a containerized routing protocol process and effectively operates as a software-only version of a router control plane.

The enhanced underlay routing provided by cRPD 324 may replace the default gateway at the forwarding plane and provide a rich routing stack for use cases that can be supported. In some examples that do not use cRPD 324, virtual router 506 will rely on the default gateway for underlay routing. In some examples, cRPD 324 as the underlay routing process will be restricted to program only the default inet(6).0 fabric with control plane routing information. In such examples, non-default overlay VRFs may be programmed by control nodes 232.

FIGS. 7A-7B illustrate the dual routing/control plane solution described above. In FIG. 7A, cRPD 324 provides underlay routing/forwarding information to virtual router agent 514, similar in some respect to how a router control plane programs a router forwarding/data plane.

As shown in FIG. 7B, cRPDs 324 exchange routing information usable to create tunnels through the underlay network 702 for VRFs. Tunnel 710 is an example and connects virtual routers 506 of server 12A and server 12X. Tunnel 710 may represent an segment routing (SR) or SRv6 tunnel, a Generic Route Encapsulation (GRE) tunnel, and IP-in-IP tunnel, an LSP, or other tunnel. Control nodes 232 leverages tunnel 710 to create virtual network 712 connecting pods 22 of server 12A and server 12X that are attached to the VRF for the virtual network.

As noted above, cRPD 324 and virtual router agent 514 may exchange routing information using a gRPC interface, and virtual router agent 5145 may program virtual router 506 with configuration using the gRPC interface. As also noted, control nodes 232 may be used for overlay and orchestration while cRPD 324 may be used for managing the underlay routing protocols. Virtual router agent 514 may use gRPC interface with cRPD 324 while using XMPP to communicate with the control node and a domain name service (DNS).

The gRPC model works well for cRPD 324 since there may be a worker running on every compute node, and the virtual router agent 316 acts as the gRPC server exposing services for the client (cRPD 324) to use to program routing and configuration information (for underlay). gRPC is thus an attractive as a solution when compared to XMPP. In particular, it transports data as a binary stream and there is no added overhead in encoding/decoding data to be sent over it.

In some examples, control nodes 232 may interface with virtual router agents 514 using XMPP. With virtual router agent 514 acting as the gRPC server, cRPD 324 acts as the gRPC client. This would mean that the client (CRPD) needs to initiate the connection towards the server (vRouter Agent). SDN architecture 700, virtual router agent 514 chooses the set of control nodes 232 it will subscribe to (since there are multiple control nodes). In that aspect, the control node 232 acts as the server and the virtual router agent 514 connects as the client and subscribes for updates.

With gRPC, the control node 232 would need to pick the virtual router agents 514 it needs to connect to and then subscribe as a client. Since the control node 232 does not run on every compute node, this would require implementing an algorithm to choose the virtual router agents 514 it can subscribe to. Further, the control nodes 232 need to synchronize this information amongst each other. This also complicates the case when restarts happen and there is a need for synchronization between the control nodes 232 to pick the agents they serve. Features such as Graceful Restart (GR) and Fast Convergence have already been implemented on top of XMPP. XMPP is already lightweight and effective. Therefore, XMPP may be advantageous over gRPC for control node 232 to virtual router agent 514 communications.

Additional enhancements to control nodes 232 and the use thereof are as follows. HA and horizontal scalability with three control-nodes. Like any routing platform, it should be sufficient to have just two control nodes 232 to satisfy the HA requirements. In many cases, this is advantageous. (However, one or more control nodes 232 may be used.) For example, it provides more deterministic infrastructure and in-line with standard routing best-practices. Each virtual router agent 514 is attached to a unique pair of control nodes 232 to avoid randomness. With two control nodes 232, debugging may be simpler. In addition, edge replication for constructing multicast/broadcast trees may be simplified with only two control notes 232. Currently, since vRouter agents 316 only connect to two of the three control nodes, all the control nodes may not have the complete picture of the tree for some time and rely on BGP to sync states between them. This is exacerbated with three control nodes 232 since virtual router agents 316 may choose two at random. If there were only two control nodes 232, every virtual router agent 316 would connect to the same control nodes. This, in turn, would mean that control nodes 232 need not rely on BGP to sync states and will have the same picture of the multicast tree.

SDN architecture 200 may provide for ingress replication as an alternative to edge-replication and provide users the option. Ingress replication can be viewed as a special degenerate case of general overlay multicast trees. In practice, however, the signaling of ingress replication trees is much simpler than the signaling of general overlay multicast trees With ingress replication, every virtual router 21 ends up with a tree with itself as the root and every other vrouter as the leaf. A virtual router 21 going down should theoretically not result in rebuilding the tree. Note that the performance of ingress replication deteriorates with larger clusters. However, it works well for smaller clusters. Furthermore, multicast is not a popular and prevalent requirement for many customers. It is mostly limited to transport broadcast BUM traffic, which only happens initially.

Configuration Handling Module Enhancements

In convention SDN architectures, the network controller handles the orchestration for all use cases. The configuration nodes translate intents into configuration objects based on the data model and write them into a database (e.g, Cassandra). In some cases, at the same time, a notification is sent to all clients awaiting the configuration, e.g., via RabbitMQ.

Control nodes not only acts as BGP speakers but also have a configuration handling module that reads configuration objects from the database in the following ways. First, when a control node comes up (or restarts), it connects to and reads all configuration directly from the database. Second, a control node may be also a messaging client. When there are updates to configuration objects, control nodes receive a messaging notification that lists the objects that have been updated. This again causes the configuration handling module to read objects from the database.

The configuration handling module reads configuration objects for both the control plane (BGP related configuration) and the vRouter forwarding plane. The configuration may be stored as a graph with objects as nodes and relationships as links. This graph can then be downloaded to the clients (BGP/cRPD and/or vRouter agent).

In accordance with techniques of this disclosure, the conventional configuration API server and messaging service are in some examples replaced by Kube api-server (API server 300 and custom API server 301) and the previous Cassandra database by etcd in Kubernetes. With this change, clients interested in configuration objects can directly do a watch on the etcd database to get updates rather than rely on RabbitMQ notifications.

Controller Orchestration for CRPD

BGP configuration can be provided to cRPDs 324. In some examples, cRPD controller 720 may be a Kubernetes controller catered to the to develop its own controller catered to the Kubernetes space and implements CRDs required for orchestration and provisioning cRPDs 324.

Distributed Configuration Handling

As mentioned earlier in this section, the configuration handling module may be part of control nodes 232. It reads configuration directly from a database, converts the data into JSON format and stores it in its local IFMAP database as a graph with objects as nodes and the relationship between them as links. This graph then gets downloaded to interested virtual router agents 514 on the compute nodes via XMPP. Virtual router agent 514 constructs the IFMAP based dependency graph locally as well to store these objects.

IFMAP as an intermediate module and the need for storing a dependency graph can be avoided by having the virtual router agents 514 directly do a watch on the etcd server in API server 300. The same model can be used by cRPD 324 running on the compute nodes. This will avoid the need for the IFMAP-XMPP config channel. A Kubernetes configuration client (for control node 232) can be used as part of this config. This client can also be used by the virtual router agents.

This can, however, increase the number of clients reading configuration from the etcd server, especially in clusters with hundreds of compute nodes. Adding more watchers eventually causes the write rate to drop and the event rate to fall short of the ideal. etcd's gRPC proxy rebroadcasts from one server watcher to many client watchers. The gRPC proxy coalesces multiple client watchers (c-watchers) on the same key or range into a single watcher (s-watcher) connected to an etcd server. The proxy broadcasts all events from the s-watcher to its c-watchers. Assuming N clients watch the same key, one gRPC proxy can reduce the watch load on the etcd server from N to 1. Users can deploy multiple gRPC proxies to further distribute server load. These clients share one server watcher; the proxy effectively offloads resource pressure from the core cluster. By adding proxies, etcd can serve one million events per second.

DNS/Named in the SDN Architecture

In previous architectures, DNS services are provided by contrail-dns and contrail-named processes working in conjunction to provide DNS services to VMs in the network. Named acts as the DNS server that provides an implementation of the BIND protocol. contrail-dns receives updates from the vrouter-agent and pushes these records to named.

Four DNS modes are supported in the system, IPAM configuration can select the DNS mode required.

1. None—No DNS support for the VMs.
2. Default DNS server—DNS resolution for the VMs is done based on the name server configuration in the server infrastructure. When a VM gets a DHCP response, the subnet default gateway is configured as the DNS server for the VM. DNS requests that the VM sends to this default gateway are resolved via the (fabric) name servers configured on the respective compute nodes and the responses are sent back to the VM.
3. Tenant DNS server—Tenants can use their own DNS servers using this mode. A list of servers can be configured in the IPAM, which are then sent in the DHCP response to the VM as DNS server(s). DNS requests that the VM sends are routed as any other data packet based on the available routing information.
4. Virtual DNS server—In this mode, the system supports virtual DNS servers, providing DNS servers that resolve the DNS requests from the VMs. We can define multiple virtual domain name servers under each domain in the system. Each virtual domain name server is an authoritative server for the DNS domain configured.

The SDN architecture described herein is efficient in the DNS services it provides. Customers in the cloud native world to be benefited by the varied DNS services. However, with the move to next generation Kubernetes-based architecture, the SDN architecture may instead use coreDNS for any DNS services.

Data Plane

The Data plane consists of two components: virtual router agent 514 (aka Agent) and virtual router forwarding plane 506 (also referred to as DPDK vRouter/Kernel vRouter) Agent 514 in the SDN architecture solution is responsible to manage the data plane component. Agent 514 establishes XMPP neighborships with two control nodes 232, then exchanges the routing information with them. The vRouter agent 514 also dynamically generates flow entries and injects them into the virtual router 506. This gives instructions to virtual router 506 about how to forward packets.

Responsibilities of Agent 514 may include: Interface with control node 232 to obtain the configuration. Translate received configuration into a form that datapath can understand (e.g., translate the data model from IFMap to the data model used by datapath) Interface with control node 232 to manage routes. And collect and export statistics from datapath to a monitoring solution.

Virtual router 506 implements the data-plane functionality that may allow a virtual network interface to be associated with a VRF. Each VRF has its own forwarding and flow tables, while the MPLS and VXLAN tables are global within virtual router 506. The forwarding tables may contain routes for both the IP and MAC addresses of destinations and the IP-to-MAC association is used to provide proxy ARP capability. The values of labels in the MPLS table are selected by virtual router 506 when VM/Container interfaces come up and are only locally significant to that vRouter. The VXLAN Network Identifiers are global across all the VRFs of the same virtual network in different virtual router 506 within a domain.

In some examples, each virtual network has a default gateway address allocated to it, and each VM or container interface receives that address in the DHCP response received when initializing. When a workload sends a packet to an address outside its subnet, it will ARP for the MAC corresponding to the IP address of the gateway, and virtual router 506 responds with its own MAC address. Thus, virtual router 506 may support a fully distributed default gateway function for all the virtual networks.

The following are examples of packet flow forwarding as implemented by virtual routers 506.

Packet Flows Between VMs/Container Interface in the Same Subnet.

The worker node could be VM or Container Interface. In some examples, the packet processing proceeds as follows:

VM1/Container Interface needs to send a packet to VM2, so virtual router 506 first looks up its own DNS cache for the IP address, but since this is the first packet, there is no entry.

VM1 sends a DNS request to the DNS server address that was supplied in the DHCP response when its interface came up.

The virtual router 506 traps the DNS request and forwards it to the DNS server running in the SDN architecture controller.

The DNS server in the controller responds with the IP address of VM2

The virtual router 506 sends the DNS response to VM1

VM1 needs to form an Ethernet frame, so needs the MAC address for VM2. It checks its own ARP cache, but there is no entry, since this is the first packet.

VM1 sends out an ARP request.

The virtual router 506 traps the ARP request and looks up the MAC address for IP-VM2 in its own forwarding tables and finds the association in the L2/L3 routes that the controller sent it for VM2.

The virtual router 506 sends an ARP reply to VM1 with the MAC address of VM2

A TCP timeout occurs in the network stack of VM1

The network stack of VM1 retries sending the packet, and this time finds the MAC address of VM2 in the ARP cache and can form an Ethernet frame and send it out.

The virtual router 506 looks up the MAC address for VM2 and finds an encapsulation route. The virtual router 506 builds the outer header and sends the resulting packet to server S2.

The virtual router 506 on server S2 decapsulates the packet and looks up the MPLS label to identify the virtual interface to send the original Ethernet frame into. The Ethernet frame is sent into the interface and received by VM2.

Packet Flow Between VMs In Different Subnets

In some examples, the sequence when sending packets to destinations in a different subnet is similar except that the virtual router 506 responds as the default gateway. VM1 will send the packet in an Ethernet frame with the MAC address of the default gateway whose IP address was supplied in the DHCP response that the virtual router 506 supplied when VM1 booted. When VM1 does an ARP request for the gateway IP address, the virtual router 506 responds with its own MAC address. When VM1 sends an Ethernet frame using that gateway MAC address, the virtual router 506 uses the destination IP address of the packet inside the frame to look up the forwarding table in the VRF to find a route, which will be via an encapsulation tunnel to the host that the destination is running on.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The invention claimed is:

1. A method comprising:
obtaining flow records indicative of packet flows among workloads deployed to a cluster of one or more computing devices configured with a network policy, wherein each flow record of the flow records indicates a corresponding packet flow was allowed or denied by the cluster;
receiving an updated network policy;
determining whether a corresponding packet flow for a flow record of the flow records has a discrepancy with the updated network policy; and
in response to determining the corresponding packet flow for the flow record of the flow records has a discrepancy with the updated network policy, outputting an indication of an error.

2. The method of claim 1, further comprising:
generating a set of allowed packet flows comprising flow records of the flow records indicating the corresponding packet flow was allowed,
wherein determining the corresponding packet flow for the flow record of the flow records has a discrepancy with the updated network policy comprises determining no rule of the updated network policy allows the corresponding packet flow.

3. The method of claim 2, further comprising:
determining at least one rule of the updated network policy allows the corresponding packet flow;
in response to determining at least one rule of the updated network policy allows the corresponding packet flow, incrementing a counter; and
validating the updated network policy with respect to allowed network traffic if a value of the counter is equal to a number of flow records in the set of allowed packet flows after all flow records in a set of blocked packet flows have been processed.

4. The method of claim 1, further comprising:
generating a set of blocked packet flows comprising flow records of the flow records indicating a corresponding packet flow was denied,
wherein determining the corresponding packet flow for the flow record of the flow records has a discrepancy with the updated network policy comprises determining a rule of the updated network policy allows the corresponding packet flow.

5. The method of claim 4, further comprising:
determining no rule of the updated network policy allows the corresponding packet flow;
in response to determining no rule of the updated network policy allows the corresponding packet flow, incrementing a counter; and
validating the updated network policy with respect to blocked network traffic if a value of the counter is equal to a number of flow records in the set of blocked packet flows after all flow records in the set of blocked packet flows have been processed.

6. The method of claim 1, further comprising:
flagging the updated network policy and associating the corresponding packet flow with the flagged, updated network policy for review.

7. The method of claim 1, wherein the discrepancy comprises one of:
(1) the updated network policy would deny the corresponding packet flow and the flow record indicates the corresponding packet flow was allowed; or
(2) the updated network policy would allow the corresponding packet flow and the flow record indicates the corresponding packet flow was denied.

8. The method of claim 1, further comprising:
in response to determining the corresponding packet flow for the flow record of the flow records does not have a discrepancy with the updated network policy, outputting an indication of validation for the updated network policy to cause the updated network policy to be configured in the cluster.

9. A method comprising:

obtaining flow records indicative of packet flows among workloads deployed to a cluster of one or more computing devices configured with a network policy, wherein each flow record of the flow records indicates a corresponding packet flow was allowed or denied by the cluster;

determining whether a corresponding packet flow for a flow record of the flow records has a discrepancy with an updated network policy; and in response to determining the corresponding packet flow for a flow record of the flow records has a discrepancy with the updated network policy, outputting an indication of an error.

10. The method of claim 9, further comprising:

generating a set of allowed packet flows comprising flow records of the flow records indicating the corresponding packet flow was allowed, wherein determining the corresponding packet flow for the flow record of the flow records has a discrepancy with the network policy comprises determining no rule of the network policy allows the corresponding packet flow.

11. The method of claim 10, further comprising determining at least one rule of the network policy allows the corresponding packet flow;

in response to determining at least one rule of the network policy allows the corresponding packet flow, incrementing a counter; and validating the set of allowed packet flows if a value of the counter is equal to a number of flow records in the set of allowed packet flows after all flow records in the set of allowed packet flows have been processed.

12. The method of claim 9, further comprising:

generating a set of blocked packet flows comprising flow records of the flow records indicating the corresponding packet flow was denied, wherein determining the corresponding packet flow for the flow record of the flow records has a discrepancy with the network policy comprises determining a rule of the network policy allows the corresponding packet flow.

13. The method of claim 12, further comprising:

determining no rule of the network policy allows the corresponding packet flow;

in response to determining no rule of the network policy allows the corresponding packet flow, incrementing a counter; and validating the set of blocked packet flows if a value of the counter is equal to a number of flow records in the set of blocked packet flows after all flow records in the set of blocked packet flows have been processed.

14. The method of claim 9, further comprising:

flagging the network policy and associating the corresponding packet flow with the flagged network policy for review.

15. The method of claim 9, further comprising:

identifying a cause of the discrepancy as either a coding issue or a connectivity issue.

16. The method of claim 9, wherein the discrepancy comprises one of:
(1) the network policy would deny the corresponding packet flow and the flow record indicates the corresponding packet flow was allowed; or
(2) the network policy would allow the corresponding packet flow and the flow record indicates the corresponding packet flow was denied.

17. The method of claim 9, further comprising:

in response to determining the corresponding packet flow for the flow record of the flow records does not have a discrepancy with the network policy, outputting an indication of validation for the obtained flow records.

18. A validation system comprising processing circuitry having access to a storage device, the processing circuitry configured to:

obtain flow records indicative of packet flows among workloads deployed to a cluster of one or more computing devices configured with a network policy, wherein each flow record of the flow records indicates a corresponding packet flow was allowed or denied by the cluster;

receive an updated network policy;

determine whether a corresponding packet flow for a flow record of the flow records has a discrepancy with the updated network policy; and in response to determining the corresponding packet flow for the flow record of the flow records has a discrepancy with the updated network policy, output an indication of an error.

19. The validation system of claim 18, wherein the processing circuitry is further configured to:

generate a set of allowed packet flows comprising flow records of the flow records indicating the corresponding packet flow was allowed, wherein determining the corresponding packet flow for the flow record of the flow records has a discrepancy with the updated network policy comprises determining no rule of the updated network policy allows the corresponding packet flow;

determine at least one rule of the updated network policy allows the corresponding packet flow;

in response to determining at least one rule of the updated network policy allows the corresponding packet flow, increment a counter; and validate the updated network policy with respect to allowed network traffic if a value of the counter is equal to a number of flow records in the set of allowed packet flows.

20. The validation system of claim 18, wherein the processing circuitry is further configured to:

generate a set of blocked packet flows comprising flow records of the flow records indicating a corresponding packet flow was denied, wherein determining the corresponding packet flow for the flow record of the flow records has a discrepancy with the updated network policy comprises determining a rule of the updated network policy allows the corresponding packet flow;

determine no rule of the updated network policy allows the corresponding packet flow;

in response to determining no rule of the updated network policy allows the corresponding packet flow, increment a counter; and validate the updated network policy with respect to blocked network traffic if a value of the counter is equal to a number of flow records in the set of blocked packet flows.

* * * * *